(12) United States Patent
Tsuchiya et al.

(10) Patent No.: US 10,936,243 B2
(45) Date of Patent: Mar. 2, 2021

(54) STORAGE SYSTEM AND DATA TRANSFER CONTROL METHOD

(71) Applicant: Hitachi, Ltd., Tokyo (JP)

(72) Inventors: Akiyoshi Tsuchiya, Tokyo (JP); Keiichi Matsuzawa, Tokyo (JP); Mitsuo Hayasaka, Tokyo (JP); Akira Yamamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/491,520

(22) PCT Filed: Aug. 3, 2017

(86) PCT No.: PCT/JP2017/028171
§ 371 (c)(1),
(2) Date: Sep. 5, 2019

(87) PCT Pub. No.: WO2019/026222
PCT Pub. Date: Feb. 7, 2019

(65) Prior Publication Data
US 2020/0073584 A1 Mar. 5, 2020

(51) Int. Cl.
*G06F 3/06* (2006.01)
(52) U.S. Cl.
CPC ............ *G06F 3/0655* (2013.01); *G06F 3/067* (2013.01); *G06F 3/0619* (2013.01); *G06F 3/0653* (2013.01); *G06F 3/0683* (2013.01)
(58) Field of Classification Search
CPC ...... G06F 3/0655; G06F 3/0646; G06F 3/067; G06F 11/1402; G06F 11/2056
See application file for complete search history.

(56) References Cited

U.S. PATENT DOCUMENTS 6,269,431 B1 7/2001 Dunham
7,275,177 B2 9/2007 Armangau et al.
8,856,073 B2 10/2014 Matsuzawa
(Continued)

FOREIGN PATENT DOCUMENTS

JP H09-212398 A 8/1997
JP 2009-009333 A 1/2009

*Primary Examiner* — Edwards J Dudek, Jr.
(74) *Attorney, Agent, or Firm* — Procopio, Cory, Hargreaves & Savitch LLP

(57) ABSTRACT

When a second storage device in a second site receives an update notification regarding a first element updated according to a write request from a first host, from a first storage device in a first site, for a second element specified on the basis of the update notification, the second storage device manages data of the first element corresponding to the second element as latest data. The first storage device provides a first volume capable of including a plurality of first elements. The second storage device provides a second volume capable of including a plurality of second elements corresponding to the plurality of first elements. When the second storage device receives a read request from a second host, the second storage device determines whether or not data of the first element corresponding to a read source second element (second element specified from the read request) is the latest data. When a determination result is true, the second storage device acquires the latest data from the first storage device and returns the latest data to the second host.

13 Claims, 20 Drawing Sheets

(56) References Cited

U.S. PATENT DOCUMENTS

| | | |
|---|---|---|
| 8,984,248 B2 | 3/2015 | Morishita et al. |
| 9,594,822 B1 * | 3/2017 | Natanzon ............... G06F 16/275 |
| 9,946,604 B1 * | 4/2018 | Glass ...................... G06F 3/065 |
| 2009/0006794 A1 | 1/2009 | Mizuta et al. |
| 2015/0046668 A1 * | 2/2015 | Hyde, II ............... G06F 3/0689 |
| | | 711/162 |
| 2015/0261678 A1 * | 9/2015 | Gupta .................... G06F 3/067 |
| | | 711/144 |
| 2018/0267723 A1 * | 9/2018 | McBride ................. G06F 3/061 |
| 2018/0341694 A1 * | 11/2018 | Brown ............... H04L 67/1095 |

* cited by examiner

SNAPSHOT MANAGEMENT TABLE
330

| PAGE ID | CoW FLAG | REFERENCE DESTINATION PAGE ID | | |
|---|---|---|---|---|
| | | FIRST GENERATION | SECOND GENERATION | ... |
| 0 | ON | 0 | -1 | ... |
| 1 | ON | -1 | -1 | ... |
| 2 | OFF | 1 | 1 | ... |
| 3 | ON | -1 | -1 | ... |
| 4 | OFF | 2 | 4 | ... |
| ... | ... | ... | ... | ... |

FIG. 6

LU MANAGEMENT TABLE
320

| LUN (521) | SIZE (522) |
|---|---|
| 0 | 100G |
| 1 | ... |
| ... | ... |

FIG. 7

UPDATE BITMAP TABLE
340

| PAGE ID (541) | UPDATE FLAG (542) |
|---|---|
| 0 | OFF |
| 1 | ON |
| ... | ... |

FIG. 8

LU MAPPING MANAGEMENT TABLE
360

| LUN (561) | COPY SOURCE STORAGE (562) | COPY SOURCE LUN (563) | COPY SOURCE GENERATION NUMBER (564) |
|---|---|---|---|
| 0 | 10.100.234.10 | 0 | 3 |
| 1 | 10.100.234.10 | 1 | 0 |
| ... | ... | ... | ... |

FIG. 9

COPY STATE MANAGEMENT TABLE
370

| PAGE ID (571) | UPDATE FLAG (572) | UNCOPIED FLAG (573) |
|---|---|---|
| 0 | OFF | ON |
| 1 | ON | OFF |
| ... | ... | ... |

FIRST SEARCH TABLE
913

| PATH NAME 921 | TYPE 922 | OBJECT ID 923 |
|---|---|---|
| / | DIRECTORY | abc |
| /DirectoryA | DIRECTORY | def |
| /DirectoryB | DIRECTORY | ghi |
| /DirectoryA/File1 | FILE | jkl |
| /DirectoryB/File2 | FILE | mno |
| /UPDATE LIST | FILE | updaet_list |

SECOND SEARCH TABLE
914

| OBJECT ID 931 | PATH NAME 932 |
|---|---|
| ghi | / |
| jkl | /DirectoryA |
| mno | /DirectoryB |
| abc | /DirectoryA/File1 |
| def | /DirectoryB/File2 |
| updaet_list | /UPDATE LIST |

FIG. 16

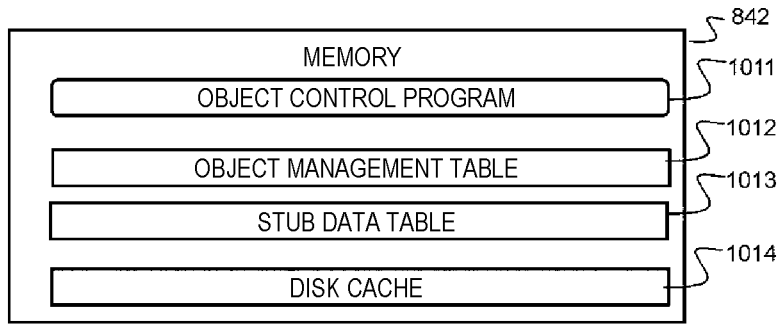

MEMORY — 842
- OBJECT CONTROL PROGRAM — 1011
- OBJECT MANAGEMENT TABLE — 1012
- STUB DATA TABLE — 1013
- DISK CACHE — 1014

FIG. 17

OBJECT MANAGEMENT TABLE
1012

| OBJECT ID (1021) | UPDATE FLAG (1022) | STUB FLAG (1023) | SIZE (1024) | STORAGE DESTINATION (1025) |
|---|---|---|---|---|
| abc | OFF | OFF | 128 byte | /localfs/abc |
| def | ON | ON | 0 | /localfs/def |
| ghi | OFF | ON | 0 | /localfs/ghi |
| ... | ... | ... | ... | ... |

FIG. 18

STUB DATA TABLE
1013

| BUCKET ID (1031) | OBJECT ID (1032) | DATA ACQUISITION DESTINATION (1033) |
|---|---|---|
| bucketA | abc | xxx.yyy.com:/fs1/ |
| bucketA | def | xxx.yyy.com:/fs1/ |
| bucketA | ghi | xxx.yyy.com:/fs1/ |
| ... | ... | ... |

FIG. 24

MIGRATION STUB DATA TABLE
1600

| FILE PATH | DATA MIGRATION SOURCE | MIGRATION SOURCE FILE PATH | STUB FLAG |
|---|---|---|---|
| /DirectoryA/File1 | zzz.yyy.com/fs/ | /DirectoryX/File1 | ON |
| /DirectoryB/File4 | zzz.yyy.com/fs/ | /DirectoryY/File4 | OFF |

Columns: 1601, 1602, 1603, 1604

FIG. 25

DATA REQUEST SOURCE MANAGEMENT TABLE
1650

| REQUEST DESTINATION FILE | REQUEST SOURCE |
|---|---|
| /DirectoryA/File1 | 10.200.100.15 |
| /DirectoryB/File2 | 192.168.10.100 |
| /DirectoryA/File1 | 10.200.100.15 |
| /DirectoryB/File4 | 192.168.10.102 |
| ... | ... |

Columns: 1651, 1652

LU MAPPING MANAGEMENT TABLE
1900

| LUN | COPY DESTINATION STORAGE | COPY DESTINATION LUN |
|---|---|---|
| 0 | xxx.yyy.com | 0 |
| 1 | xxx.yyy.com | 1 |
| ... | ... | ... |

1901　　　1902　　　1903

STORAGE SYSTEM AND DATA TRANSFER CONTROL METHOD

CROSS-REFERENCE TO RELATED APPLICATIONS

This application is a U.S. National Stage entry of PCT Application No: PCT/JP2017/028171, filed on Aug. 3, 2017, the contents of which are incorporated herein by reference.

TECHNICAL FIELD

The present invention relates generally to data transfer between site (between storage devices).

BACKGROUND ART

As applications of a computer system, applications that optimize a task by analyzing data obtained by technology such as Internet of Things (IoT) and stored in a storage device in a site and feeding back an analysis result are known. In such applications, in order to analyze data of a plurality of sites in a central data center in a cross-sectoral manner, the central data center should be able to refer to the data of each site. The "site" is an example of a "first site" and the "central data center" is an example of a "second site". The "site" (both the first and second sites) mentioned herein refers to a site where a computer system such as a data center or a network segment is installed. The computer system of each site includes a storage device.

Since the central data center refers to the data of each site, the storage device of each site transfers the data to the central data center. For example, PTL 1 discloses technology for replicating data of the first site to the second site by asynchronously transferring data updating performed for the first site to the second site. When the technology is applied between the distributed sites and the central data center described above, all updating data is transferred to the central data center. In the technology of PTL 1, even when only a part of the data is required for analysis, it is necessary to transfer all the updating data. For this reason, the analysis cannot be started until all data of each site is completely transferred to the central data center, so that there is a problem that utilization of the analysis result in the task is delayed. In addition, there is a problem that a network bandwidth between each site and the central data center is consumed excessively.

On the other hand, as technology for causing the data of the first site to be accessible from the second site without requiring the completion of copying of all data, for example, there is technology disclosed in PTL 2. According to PTL 2, when a storage device having received an access request among a plurality of storage devices does not hold data of an access target according to the request, the access request is transferred to an external storage device, so that the data of the access target is acquired from the external storage. Since this processing is volume unit processing, all data stored in a single volume is to be transferred. For this reason, it is not possible to perform management of fine granularity of leaving a part of the data in the central data center. As a result, if analysis processing executed in the central data center accesses data of a remote site, data access of the analysis processing involves data copying between the sites, which results in causing performance degradation of the analysis processing.

With regard to the data copying, technologies disclosed in PTL 3 and PTL 4 are also known.

CITATION LIST

Patent Literature

PTL 1: U.S. Pat. No. 7,275,177
PTL 2: U.S. Pat. No. 6,269,431
PTL 3: U.S. Pat. No. 8,984,248
PTL 4: U.S. Pat. No. 8,856,073

SUMMARY OF INVENTION

Technical Problem

Accordingly, an object of the present invention is to, when data stored in a plurality of first sites is to be accessed (for example, to be analyzed) by a second site, enable access to data of each of the first sites without waiting for completion of data copying from each of the first sites to the second site while suppressing degradation of access performance in the second site, and suppress consumption of a network bandwidth between the first sites and the second site.

Solution to Problem

A first storage device exists in a first site. A second storage device exists in a second site. The second storage device is a storage device that is connected to the first storage device via a network.

The first storage device provides a first volume that can include a plurality of first elements each of which is a volume area or a data set. The second storage device provides a second volume that can include a plurality of second elements each of which is a volume area or a data set and which correspond to the plurality of first elements.

The first storage device transmits an update notification, which includes an ID of the first element updated according to a write request from a first host, to the second storage device. When the second storage device receives the update notification, for the second element corresponding to the first element specified from the update notification, the second storage device manages data of the first element corresponding to the second element as latest data.

When the second storage device receives a read request from a second host, the second storage device determines whether or not data of the first element corresponding to a read source second element to be the second element specified from the read request is the latest data. When a determination result is true, the second storage device transmits an acquisition request of the latest data to the first storage device. The second storage device sets the latest data acquired from the first storage device in response to the acquisition request as data of the read source second element and returns the latest data to the second host.

Advantageous Effects of Invention

A second host can refer to data in a first site without waiting for all data in the first site to be copied to a second site. Since the data acquired from the first site to the second site by the reference is stored in the second site, the data can be used thereafter. As a result, it can be expected to suppress degradation of access performance in the second site thereafter. Further, an amount of data transferred from the first site to the second site is reduced, so that it is possible to reduce consumption of a network bandwidth.

BRIEF DESCRIPTION OF DRAWINGS

FIG. 6 is a configuration diagram of an LU management table in the first embodiment.

FIG. 7 is a configuration diagram of an update bitmap table in the first embodiment.

FIG. 8 is a configuration diagram of an LU mapping management table in the first embodiment.

FIG. 9 is a configuration diagram of a copy state management table in the first embodiment.

FIG. 16 is a diagram showing programs and tables stored in a memory of an object controller in the second embodiment.

FIG. 17 is a configuration diagram of an object management table in the second embodiment.

FIG. 18 is a configuration diagram of a stub data table in the second embodiment.

FIG. 24 is a configuration diagram of a migration stub data table in the fourth embodiment.

FIG. 25 is a configuration diagram of a data request source management table in the fourth embodiment.

DESCRIPTION OF EMBODIMENTS

Figure 1:
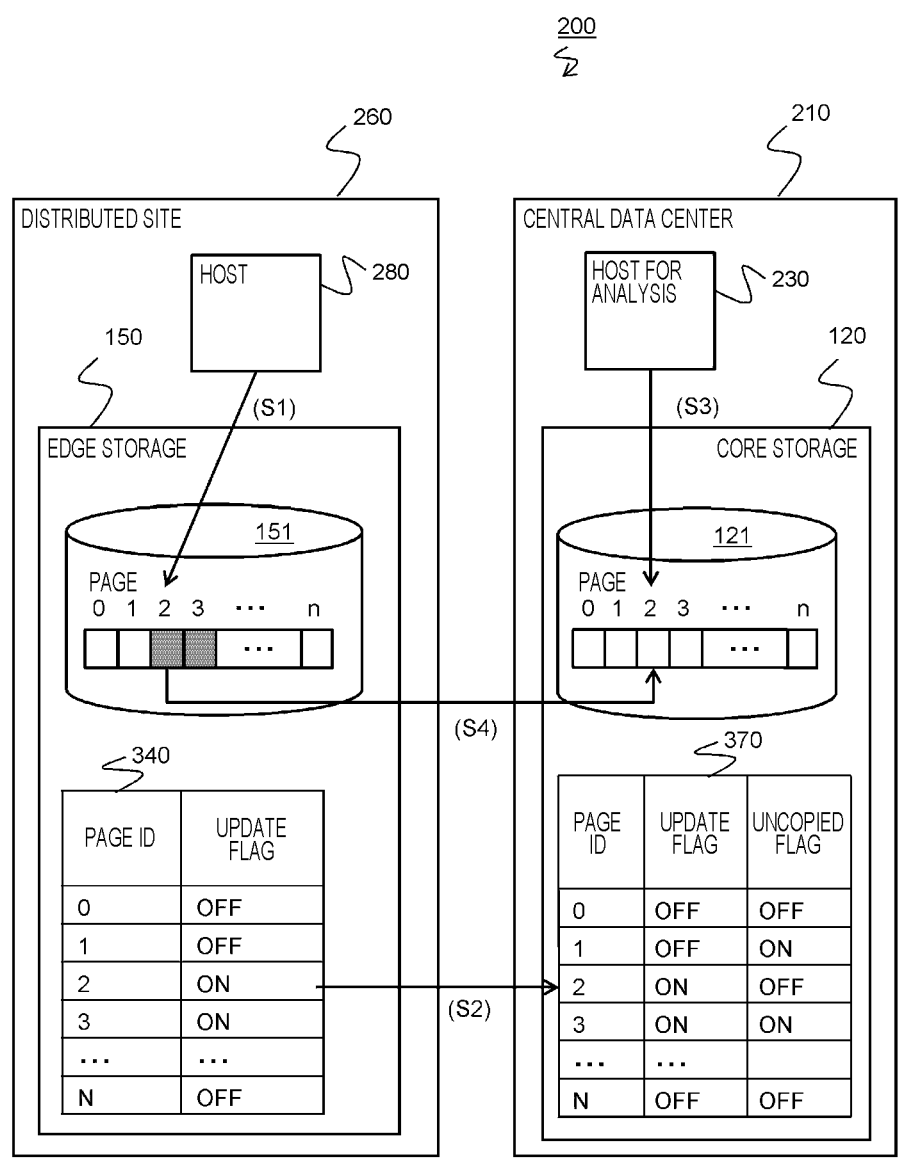
FIG. 1 is a schematic diagram showing an outline of a first embodiment.

In the following description, an "interface unit" may include at least one of a user interface unit and a communication interface unit. The user interface unit may include at least one I/O device in one or more I/O devices (for example, an input device (for example, a keyboard and a pointing device) and an output device (for example, a display device)) and computers for display. The communication interface unit may include one or more communication interface devices. One or more communication interface devices may be the same type of one or more communication interface devices (for example, one or more network interface cards (NICs)) or may be different types of two or more communication interface devices (for example, the NIC and a host bus adapter (HBA)).

Further, in the following description, a "memory unit" may include one or more memories. At least one memory may be a volatile memory or may be a non-volatile memory. The memory unit is mainly used for processing by a processor unit.

Further, the following description, the "processor unit" may include one or more processors. At least one processor is typically a microprocessor such as a central processing unit (CPU). Each of one or more processors may be a single core or may be a multicore. The processor unit may include a hardware circuit (for example, a circuit for parity calculation) that performs a part or all of processing.

Further, in the following description, information may be described by an expression such as an "xxx table", but the information may be expressed by any data structure. That is, to indicate that the information does not depend on the data structure, the "xxx table" can be called "xxx information". Further, in the following description, a configuration of each table is an example, and one table may be divided into two or more tables or a part or all of two or more tables may be one table.

Further, in the following description, processing may be described with a "program" as the subject. However, the program is executed by the processor unit and determined processing is performed using the memory unit and/or the interface unit appropriately, so that the subject of the processing may be the processor unit (or a device or system having the processor unit). The program may be installed on a device such as a computer from a program source. The program source may be, for example, a program distributed server or computer readable recording medium (for example, a non-transitory recording medium). Further, in the following description, two or more programs may be realized as one program or one program may be realized as two or more programs Further, in the following description, a "distributed site" is an example of a first site. A "central data center" is an example of a second site.

Further, in the following description, the "storage system" includes one or more first storage devices respectively possessed by one or more first sites and a second storage device possessed by a second site with respect to one or more first sites. Each storage device includes one or more storage machines. At least one storage machine may be a general-purpose physical computer or may be a disk array device having two or more storage devices. Further, at least one storage machine may be a virtual storage machine or may execute software-defined anything (SDx). As the SDx, for example, a software defined storage (SDS) (an example of the virtual storage device) or a software-defined datacenter (SDDC) can be adopted. For example, the SDS as the storage device and a virtual computer as a host computer may be executed on a computer system in the same site.

Further, in the following description, a "volume" is an abbreviation of a logical volume and is a logical storage area. The volume may be a substantial volume (RVOL) or may be a virtual volume (VVOL). The "RVOL" may be a volume based on physical storage resources (for example, one or more physical drives) of the storage system providing the RVOL. The "VVOL" may be a volume that includes a plurality of virtual areas (virtual storage areas) and conforms to capacity virtualization technology (typically, thin provisioning).

First Embodiment

FIG. 1 is a schematic diagram showing an outline of a first embodiment.

A computer system 200 has one or more distributed sites 260 (an example of a first site) and one central data center 210 (an example of a second site). Hereinafter, one distributed site 260 will be taken as an example.

A host computer (hereinafter, referred to as a host) 280 and a storage device (hereinafter, referred to as an edge storage) 150 exist in the distributed site 260. The host 280 is an example of a first host. The edge storage 150 is an example of a first storage device. A host computer for analysis (hereinafter, referred to as a host for analysis) 230 and a storage device (hereinafter, referred to as a core storage) 120 exist in the central data center 210. The host 230 for analysis is an example of a second host and is a host used for analysis. The core storage 120 is an example of a second storage device. A storage system includes the edge storage 150 and the core storage 120.

In the distributed site 260, the edge storage 150 provides a volume 151 (an example of a first volume) to the host 280. The edge storage 150 receives, from the host 280, an access request (write request or read request) designating the volume 151. For example, when the edge storage 150 receives the write request designating the volume 151 from the host 280, the edge storage 150 writes write target data according to the write request to the volume 151. The volume 151 includes a plurality of volume areas. The write target data is written to one or more volume areas of the write destination. In the present embodiment, the volume 151 is a VVOL (volume according to thin provisioning), and the volume area is a page. The volume area is an example of an element in the volume.

Likewise, in the central data center 210, the core storage 120 provides a volume 121 (an example of a second volume) to the host 230 for analysis. The core storage 120 receives an access request designating the volume 121 from the host 230 for analysis. For example, when the core storage 120 receives a read request designating the volume 121 from the host 230 for analysis, the core storage 120 reads read target data according to the read request from the volume 121 and returns the read data to the host 230 for analysis. The volume 121 includes a plurality of volume areas. The read target data is read from one or more volume areas of read sources. In the present embodiment, the volume 121 is a VVOL (volume according to thin provisioning), and the volume area is a page.

The edge storage 150 manages an update bitmap table 340. The update bitmap table 340 is a table for managing the presence or absence of updating for each page (a difference between volumes configuring a volume pair). For example, the update bitmap table 340 has a page ID and an update flag for each page of the volume 151. The page ID and the update flag for each page are as follows.

The page ID is an ID of a page.

The update flag is a flag (bit) indicating the presence or absence of updating of the page.

When data is written to a page of the update flag "OFF", the edge storage 150 updates the update flag from "OFF" to "ON".

The core storage 120 manages a copy state management table 370. The copy state management table 370 manages whether or not there is a data acquisition target (whether or not there is latest data in a corresponding page in the edge storage 150), for each page of the volume 121. For example, the copy state management table 370 has a page ID, an update flag, and an uncopied flag for each page of the volume 121. For each page, the page ID, the update flag, and the uncopied flag are as follows.

The page ID is an ID of a page.

The update flag (an example of a first information element) is a flag indicating whether an update notification including an ID of a page corresponding to the page has been received after data copying last time from the edge storage 150 to the core storage 120.

The uncopied flag (an example of a second information element) is a flag indicating whether or not data is uncopied from the edge storage 150 to the page of the core storage 120 after the volume 121 is created (provided).

With regard to the copy state management table 370, when at least one of the update flag and the uncopied flag is "ON" for each page, the page is a data acquisition target. If the update flag and the uncopied flag are "OFF", the page is not the data acquisition target. That is, the "latest data" is data that has been recently updated or data that has not been copied (acquired) even once, regardless of whether or not the data has been updated.

When the edge storage 150 receives a write request designating the volume 151 from the host 280 (S1), the edge storage 150 writes data to the write destination page (page belonging to an address designated by the write request). Further, when the update flag (update flag in the update bitmap table 340) corresponding to the write destination page is "OFF", the edge storage 150 updates he update flag to "ON" and transmits an update notification including a page ID of the write destination page to the core storage 120 (S2). That is, when a page is updated, the edge storage 150 notifies the core storage 120 of the updated page. The core storage 120 that has received the update notification updates the update flag to "ON", when the update flag corresponding to the page ID in the update notification is "OFF". That is, the core storage 120 records, in the copy source volume 151, that updating has occurred in the notified page.

The core storage 120 can know the page updated in the edge storage 150 from the update notification. However, at a point of time when the update notification is received, the core storage 120 may not acquire the data in the page. This is because, when the data is not read target data according to the read request for analysis, data transfer according to the acquisition of the data is wasted.

When the core storage 120 receives the read request designating the volume 121 from the host 230 for analysis (S3), the core storage 120 determines whether or not the read source page (page to which the address designated by the read request belongs) is the data acquisition target.

When a determination result is true, the core storage 120 copies (acquires) data from the copy source page (page in the volume 151 corresponding to the read source page) corresponding to the read source page (S4), and returns the copied data to the host 230 for analysis as a response to the read request received in S3. Further, when both the update flag and the uncopied flag corresponding to the read source page are "ON", the core storage 120 updates the update flag and the uncopied flag to "OFF". Further, the edge storage 150 may set the update flag in the update bitmap table 340 to "OFF", for the page storing the acquired data (page in the volume 151 corresponding to the read source page).

When the determination result is false, the core storage 120 reads data from the read source page and returns the read data to the host 230 for analysis.

Hereinafter, the first embodiment will be described in detail.

Figure 2:
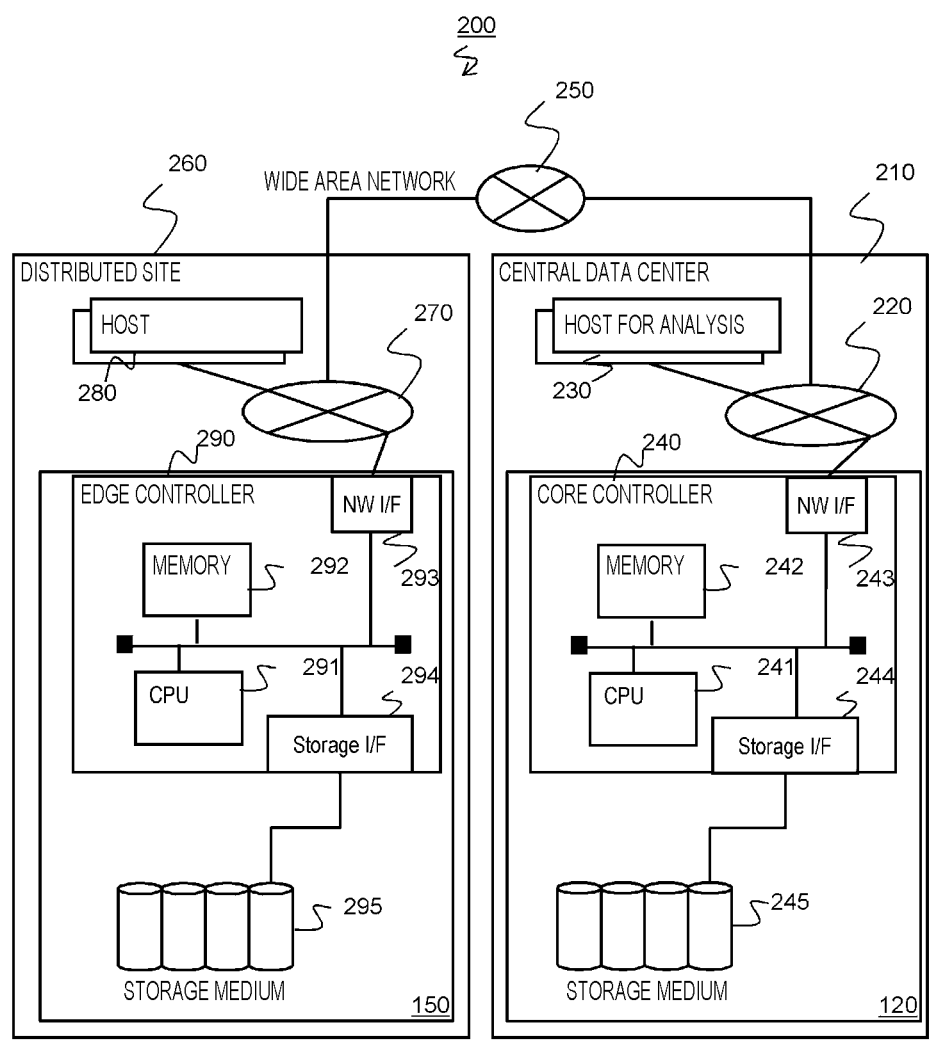
FIG. 2 is a configuration diagram of a computer system in the first embodiment.

FIG. 2 is a configuration diagram of the computer system 200.

The computer system 200 includes a central data center 210 and one or more distributed sites 260. The central data center 210 and the distributed sites 260 are connected to each other by a wide area network 250 (for example, a wide area network (WAN) or the Internet). The wide area network 250 may be an internal network. The edge storage 150 has one or more storage media 295 and a controller (hereinafter, referred to as an edge controller) 290 to control input/output with respect to one or more storage media 295. The core storage 120 has one or more storage media 245 and a controller (hereinafter, referred to as a core controller) 240 to control input/output with respect to one or more storage media 245. The edge controller 290 is an example of a first controller. The core controller 240 is an example of a second controller.

In the central data center 210, the core controller 240 and one or more hosts 230 for analysis are connected via an internal network 220 connected to the wide area network 250. The core controller 240 is a device that stores or provides data to which the host 230 for analysis refers. The host 230 for analysis is a computer that accesses data stored by the core controller 240 and data of the edge storage 150 which the core controller 240 can access transparently (without the host 230 for analysis recognizing that the data is in the edge storage 150) and processes or analyzes the data.

The core controller 240 has a function of enabling the host 230 for analysis to transparently access the data stored by the edge storage 150 existing in each distributed site 260. The core controller 240 includes a CPU 241, a memory 242, a network interface 243, and a storage interface 244, which are internally connected to each other. The CPU 241 is an example of a processor unit, and controls components of the core controller 240 according to the description of programs stored in the memory 242. The memory 242 is an example of a memory unit, stores a plurality of programs and tables, and has a disk cache. Each of the network interface 243 and the storage interface 244 is an example of an interface unit. The core controller 240 processes an access request by the host 230 for analysis via the network interface 243 and the internal network 220, and communicates with the edge controller 290 via the wide area network 250. As a communication protocol via the network interface 243, Ethernet (registered trademark), Fibre Channel, Small Computer System Interface (SCSI), or the like can be used. Further, the core controller 240 reads and writes data from and to the storage medium 245 via the storage interface 244. As the storage medium 245, a magnetic disk, an optical disk, a NAND flash, a non-volatile memory, or the like can be used. Further, other storage controllers can be used hierarchically. As a communication protocol between the storage interface 244 and the storage medium 245, SCSI, Serial Attached SCSI (SAS), Advanced Technology Attachment (ATA), Non-Volatile Memory express (NVMe), or the like can be used. The present embodiment is not limited to the communication protocols and the storage media described herein, and is applicable to communication protocols and storage media that can be used by general computers.

In the distributed site 260, the edge controller 290 and one or more hosts 280 are connected via an internal network 270 connected to the wide area network 250. The edge controller 290 is a device that stores data generated by the host 280. The host 280 stores the data generated and acquired by the host 280 in the edge storage 150.

The edge controller 290 includes a CPU 291, a memory 292, a network interface 293, and a storage interface 294, which are internally connected to each other. The CPU 291 is an example of a processor unit, and controls components of the edge controller 290 according to the description of programs stored in the memory 292. The memory 292 is an example of a memory unit, stores a plurality of programs and tables, and has a disk cache. Each of the network interface 293 and the storage interface 294 is an example of an interface unit. The edge controller 290 receives an access request by the host 280 via the network interface 293 and the internal network 270, and communicates with the core controller 240 via the wide area network 250. Further, the edge controller 290 reads and writes data from and to the storage medium 295 via the storage interface 294. As each communication protocol and the storage medium 295 of the edge controller 290, a communication protocol and a storage medium equivalent to those of the core controller 240 can be used.

Figure 3:
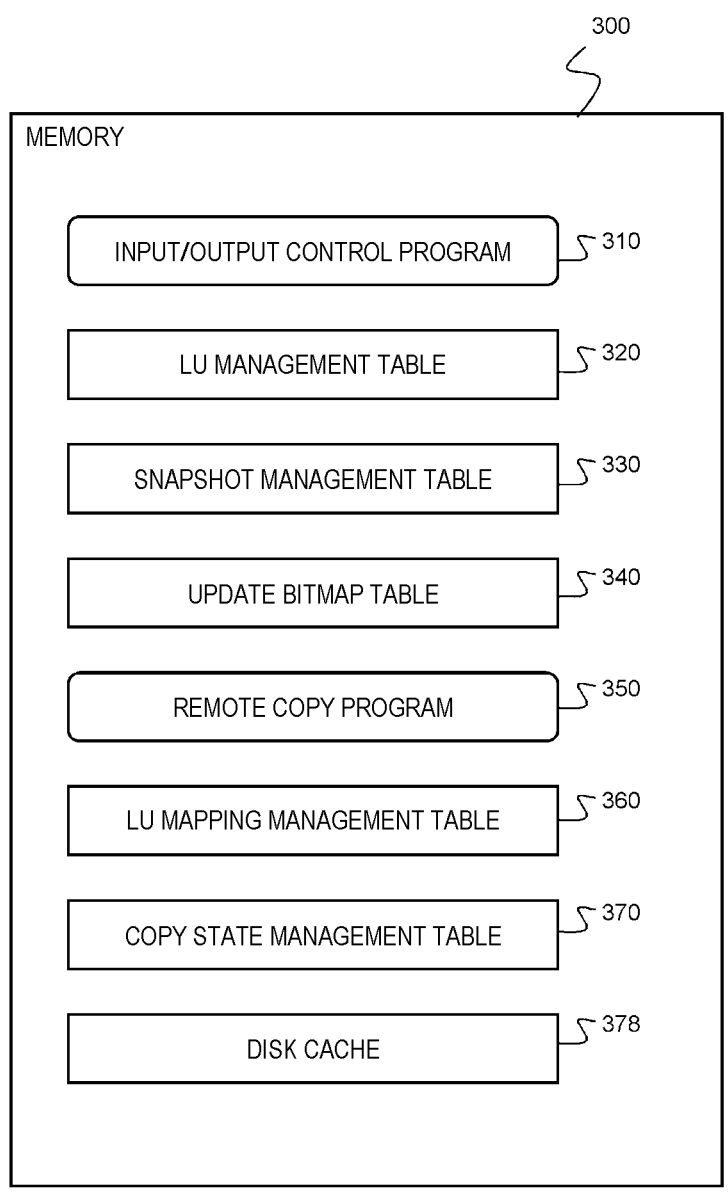
FIG. 3 is a diagram showing programs and tables stored in a memory of a core controller in the first embodiment.

FIG. 3 is a diagram showing various programs and tables stored in the memory 242 of the core controller 240 and the memory 292 of the edge controller 290. Hereinafter, both the memories 242 and 292 are collectively described as a "memory 300". Although some elements of the programs and the tables in the memory 300 exist only in one of the memories 242 and 292, the elements are described individually. Each element is included in both the memories 242 and 292 unless otherwise noted.

An input/output control program 310 is a program that, when the core controller 240 or the edge controller 290 receives an access request from the host 230 for analysis or the host 280, performs inter-site data transfer processing by a remote copy program 350 as necessary, reads and writes the data of the storage medium 245 or 295, and returns a result thereof to the host 230 for analysis or the host 280. The input/output control program 310 configures and manages a logical unit (LU) to be a management unit of volumes visible to the host 230 for analysis and the host 280. The LU is generated by dividing or linking areas of the storage medium 245 or 295. The LU may be synonymous with the volume. Further, the input/output control program 310 can be accompanied by a redundancy mechanism such as area duplication, redundant array of independent (or inexpensive) disks (RAID), and erasure coding. The input/output control program 310 has a function of creating and managing snapshots of LUs.

The LU management table 320 stores configuration information of the LUs. A snapshot management table 330 stores configuration information of snapshots of the LUs. An update bitmap table 340 is temporarily stored in the case of exchanging bitmap information necessary for snapshot management using Copy on Write (CoW) between the sites. A remote copy program 350 is a program that communicates with the core controller 240 and the edge controller 290 via the network interface 243 or 293 and the wide area network 250 and transmits and receives data.

An LU mapping management table 360 is a table that is held only by the core controller 240, and is a table that manages an association between LUs managed by the core controller 240 and LUs managed by the edge controller 290.

A copy state management table 370 is a table held only by the core controller 240. The copy state management table 370 indicates whether or not data acquisition from the edge controller 290 is necessary, for each area of the LUs.

In the memory 300, a surplus area to be an entire or partial area other than the area storing the various program and tables can be used as the disk cache 380 of the storage medium 245 or 295.

Figures 4, 5:
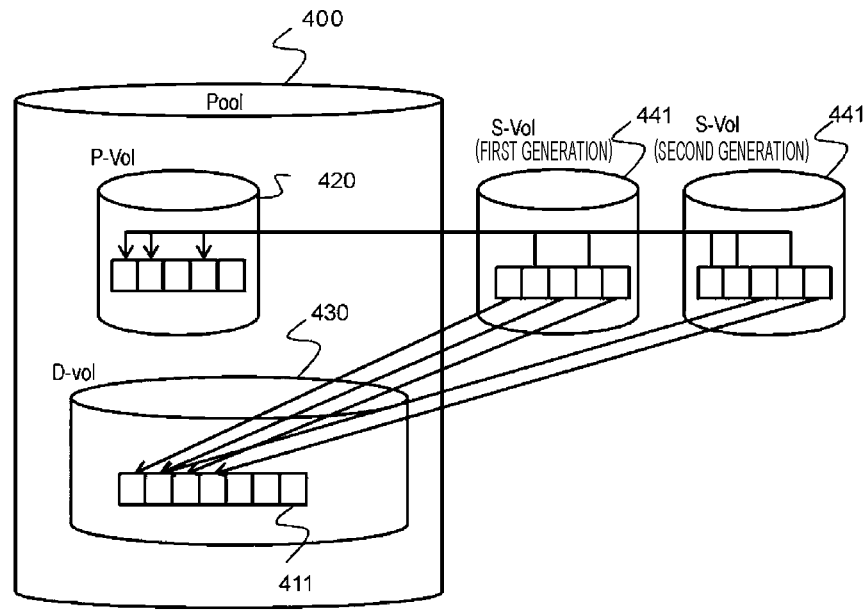
FIG. 4 is a diagram showing an outline of a snapshot acquisition operation in the first embodiment.
FIG. 5 is a configuration diagram of a snapshot management table in the first embodiment.

FIG. 4 is a diagram showing an outline of an operation of snapshot acquisition of each of the core controller 240 and the edge controller 290. Hereinafter, the core controller 240 is taken as an example.

An LU of the access destination of the host 230 for analysis is a primary volume (P-vol) 420. A snapshot of the P-vol is a snapshot volume (S-vol) 441. The S-vol 441 exists for each generation. An LU for managing inter-generation differences is a differential volume (D-vol) 430. The P-vol 420 and the D-vol 430 are stored (or associated) in a pool 400 constructed on one or more storage media 245. The S-vol 441 is a virtual volume including the P-vol 420 and the D-vol 430, and the S-vol itself is not stored on the storage medium 245. Further, since S-vol 441 exists for each snapshot generation, a plurality of S-vols 441 can be created for the P-vol.

Each of the P-vol 420, the D-vol 430, and the S-vol 441 is managed in a unit of a fixed-length volume area (page 411). Each page 411 in each S-vol 441 is associated with the page 411 of the same position in the P-vol 420 or the page 411 in the D-vol 430. When the core controller 240 receives an access request designating the S-vol 441 from the host 230 for analysis, the core controller 240 regards the access request as an access request to a page in the P-vol 420 or the D-vol 430 corresponding to an access destination page designated by the access request. This correspondence relation is managed by the snapshot management table 330 in the core controller 240. Further, the page in the P-vol can be called the "P-vol page", the page in the D-vol can be called the "D-vol page", and the page in the S-vol can be called the "S-vol page".

The pool 400 may include, for example, a plurality of real areas based on one or more storage media 245. Each real area is a logical storage area. Some real areas of the plurality of real areas may be a plurality of D-vol pages configuring the D-vol 430. Further, the real area may be allocated to the P-vol page of the P-vol to be the VVOL. Further, the real area may be allocated to the D-vol page, when the D-vol is also the VVOL.

FIG. 5 is a configuration diagram of the snapshot management table 330.

The snapshot management table 330 exists for each LU corresponding to the P-vol 420. The snapshot management table 330 can specify the corresponding P-vol page or D-vol page as the reference destination of the S-vol page, by an ID of the P-vol page and a generation number of the snapshot. The snapshot management table 330 has an entry for each page in the P-vol. Each entry stores information such as a page ID 451, a CoW flag 452, and a reference destination page ID 453. Hereinafter, one P-vol page is taken as an example (referred to as a "target page" in the description of FIG. 5).

The page ID 451 is an identifier that uniquely indicates the target page. A serial number may be given to a page group configuring the volume from the head, or a hash value or the like may be used. In the example of the diagram, a serial number starting from 0 is given as the page ID 451 of the P-vol. The CoW flag 452 indicates whether or not the CoW (to save data in the target page when the target page is the write destination) is necessary for the target page. "ON" means that the CoW is necessary. The reference destination page ID 453 is a page ID of the reference destination page of the S-vol page corresponding to the target page, for each snapshot generation. Specifically, "−1" indicates an ID of the P-vol page at the same position, that is, a page ID of the target page. Values other than "−1" indicate IDs of the D-vol pages.

When the number of generations is large, it is necessary to search the snapshot management table 330 by one row in order to determine whether or not the reference destination page ID 453 "−1" is stored. In order to speed up this processing, the core controller 240 may previously obtain the presence or absence of the reference destination page ID 453 "−1", and prepare the value of the CoW flag 452 according to the presence or absence.

When at least one P-vol page is referenced from the S-vol (that is, at least one reference destination page ID 453 "−1" is stored in the snapshot management table 330), the data in the P-vol is shared with the snapshot. In this state, when the data is updated with respect to the P-vol page or the S-vol page referring to the P-vol page, the core controller 240 performs saving of the data using the CoW.

When the P-vol page corresponding to the Cow flag 452 "ON" is an update target (write destination), the core controller 240 performs the following.

The data in the P-vol page of the update target is copied to the free D-vol page.

The reference destination page IDs of all S-vol pages referring to the P-vol pages are changed to the page ID of the copy destination D-vol page.

The data in the P-vol page of the update target is updated.

The Cow flag 452 is changed to "OFF".

When the P-vol page corresponding to the Cow flag 452 "OFF" is the update target, the core controller 240 performs the following.

The data in the P-vol page of the update target is updated.

When the S-vol page is the update target and the reference destination page of the S-vol page of the update target is the P-vol page, the core controller 240 performs the following.

The data in the reference destination P-vol page of the S-vol page of the update target is copied to the free D-vol page.

The reference destination page ID of the S-vol page of the update target is changed to the page ID of the copy destination D-vol page.

The data in the copy destination D-vol is updated.

In this way, updating of the P-vol or the S-vol can be performed without affecting the data of other P-vol or generation S-vol.

When the snapshot is created, the core controller 240 creates an S-vol associated with a new generation number, and allows the reference destination information of the corresponding generation to be stored in the snapshot management table 330. At this time, since the contents of the P-vol and the S-vol are the same at the moment of creating the snapshot, the core controller 240 sets the reference destination page IDs 453 of all S-vol pages of the S-vol to "−1", and sets the CoW flags 452 of all P-vol pages of the P-vol to "ON".

FIG. 6 is a configuration diagram of the LU management table 320.

One LU management table 320 exists in each of the core controller 240 and the edge controller 290. The LU management table 320 has an entry for each LU. The LU mentioned herein corresponds to any one of the P-vol, the D-vol, and the S-vol. Each entry stores information such as an LUN 521 and a size 522. Hereinafter, one LU is taken as an example (referred to as a "target LU" in the description of FIG. 6).

The LUN 521 is a logical unit number (LUN) to be an example of an ID of the target LU. The size 522 indicates a size (capacity) of the target LU.

FIG. 7 is a configuration diagram of the update bitmap table 340.

The update bitmap table 340 is a table that is temporarily generated to exchange information indicating presence/absence of updating of each page configuring the LU between the edge controller 290 and the core controller 240. The update bitmap table 340 exists for each volume pair (LU pair). The volume pair mentioned herein is a pair of a volume that can be referred to by the host 230 for analysis (a volume provided by the core storage 120) and a volume that can be updated by the host 280 (a volume provided by the edge storage 150). The update bitmap table 340 has an entry for each page of the volume. Each entry stores information such as a page ID 541 and an update flag 542. Hereinafter, one page is taken as an example (referred to as the "target page" in the description of FIG. 7).

The page ID 541 is a page ID of the target page. The update flag 542 is a flag (bit) indicating the presence or absence of updating of the target page.

Instead of the page ID 541 and the update flag 542, another data structure including equivalent contents may be used for the target page. For example, a data structure in which only page IDs for which update flags are set are listed as a list, or a data structure in which a data amount is reduced by an algorithm such as Run Length for a bitmap can be applied.

The update bitmap table 340 is, for example, a table that indicates a difference (updated page ID) between a volume of a latest generation n (a volume in the edge storage 150) and a volume of a generation (for example, a snapshot generation (n−1)) when update notification is transmitted last time. The update notification may include the update bitmap table 340.

FIG. 8 is a configuration diagram of the LU mapping management table 360.

The LU mapping management table 360 is a table stored by the core controller 240. The LU mapping management table 360 has an entry for each LU in the core storage 120. Each entry stores information such as a LUN 561, a copy source storage 562, a copy source LUN 563, and a copy source generation number 564. Hereinafter, one LU is taken as an example (referred to as a "target LU" in the description of FIG. 8).

The LUN 561 is an LUN of the target LU. The copy source storage 562 is an ID (for example, an address) of the edge storage 150 having the copy source LU of the target LU (the LU that forms a pair with the target LU). The copy source LUN 563 is an LUN of the copy source LU of the target LU.

The copy source generation number 564 indicates a generation number associated with the copy source LU of the target LU. "0" means that the copy source LU is the P-vol, and a number larger than "0" may mean that the copy source LU is the S-vol.

From the copy source storage 562, the copy source LUN 563, and the copy source generation number 564, the edge controller 290 in the distributed site 260 and the LU (generation) managed by the edge controller 290 can be uniquely identified. As the copy source storage 562, for example, an IP address or a host name in TPC/IP, World Wide Name (WWN) in Fibre Channel, Qualified Name in iSCSI, or the like can be used.

FIG. 9 is a configuration diagram of the copy state management table 370.

The copy state management table 370 is a table stored by the core controller 240. The copy state management table 370 exists for each LU configuring a volume pair. The copy state management table 370 has an entry for each page. Each entry stores information such as a page ID 571, an update flag 572, and an uncopied flag 573. Hereinafter, one page is taken as an example (referred to as a "target page" in the description of FIG. 9).

The page ID 571 is an ID that uniquely specifies the target page.

The update flag 572 indicates whether or not updating of the target page has been notified from the edge controller 290 to the core controller 240, after the data copying last time from the edge controller 290 to the core controller 240, for the target page.

The uncopied flag 573 indicates whether or not data is uncopied to the target page from the edge controller 290 to the core controller 240, after the LU corresponding to the table 370 is created by the core controller 240.

Figure 10:
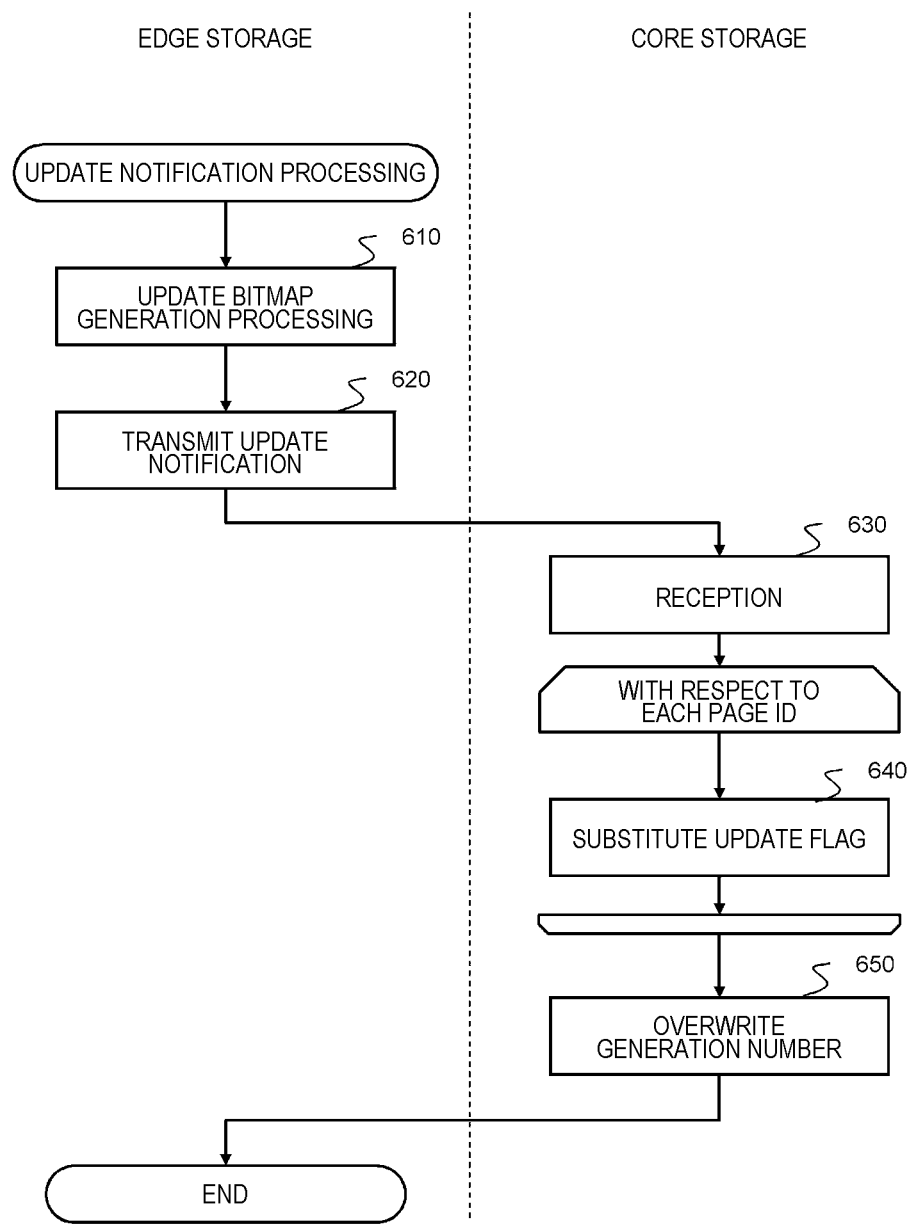
FIG. 10 is a flowchart of update notification processing in the first embodiment.

FIG. 10 is a flowchart of update notification processing.

The update notification processing starts when the snapshot is created in the edge controller 290.

The edge controller 290 receives generation numbers of the following two snapshots as an input.

Snapshot created this time.

Snapshot corresponding to the generation number 564 transmitted when the update bitmap table 340 is transmitted to the core controller 240 last time.

As an output, the edge controller 290 transmits, to the core controller 240, the update bitmap table 340 indicating the presence or absence of updating of each page between the above two snapshots.

A detailed procedure of the update notification processing is, for example, as follows.

The edge controller 290 generates the update bitmap table 340 on the basis of the snapshot management table 330 (step 610). The update bitmap table 340 indicates the presence or absence of updating on each page between snapshots of two generation numbers given as an input. In the presence or absence of updating of each page, for example, the presence of updating can be determined at the time of mismatching between reference destination pages of both the generations of the snapshot management table 330. The edge controller 290 associates the generated update bitmap table 340 with the LUN of the generated snapshot (S-vol) and the newer generation number of the input, and transmits the update bitmap table 340 with which the LUN and the generation number are associated to the core controller 240 via the wide area network 250 (step 620).

When the core controller 240 receives the update bitmap table 340 (and the LUN and the generation number) from the edge controller 290 (step 630), the core controller 240 starts updating the copy state management table 370. The core controller 240 refers to the LU mapping management table 360, searches the entry including the edge controller 290 of the transmission source and the copy source storage 562 and the copy source LUN 563 matched with the transmitted LUN, and specifies the LUN 561 in the corresponding entry. The core controller 240 refers to the entry corresponding to each page in the update bitmap table 340, and overwrites the update flag 572 of the entry matched with the page ID 571 in the copy state management table 370 corresponding to the specified LUN 561 with the update flag 542 in the update bitmap table 340 (step 640). When the overwrite processing is completed for all pages, the core controller 240 overwrites the received generation number with the copy source generation number 564 of the corresponding entry (entry in the LU mapping management table 360) (step 650).

Figure 11:
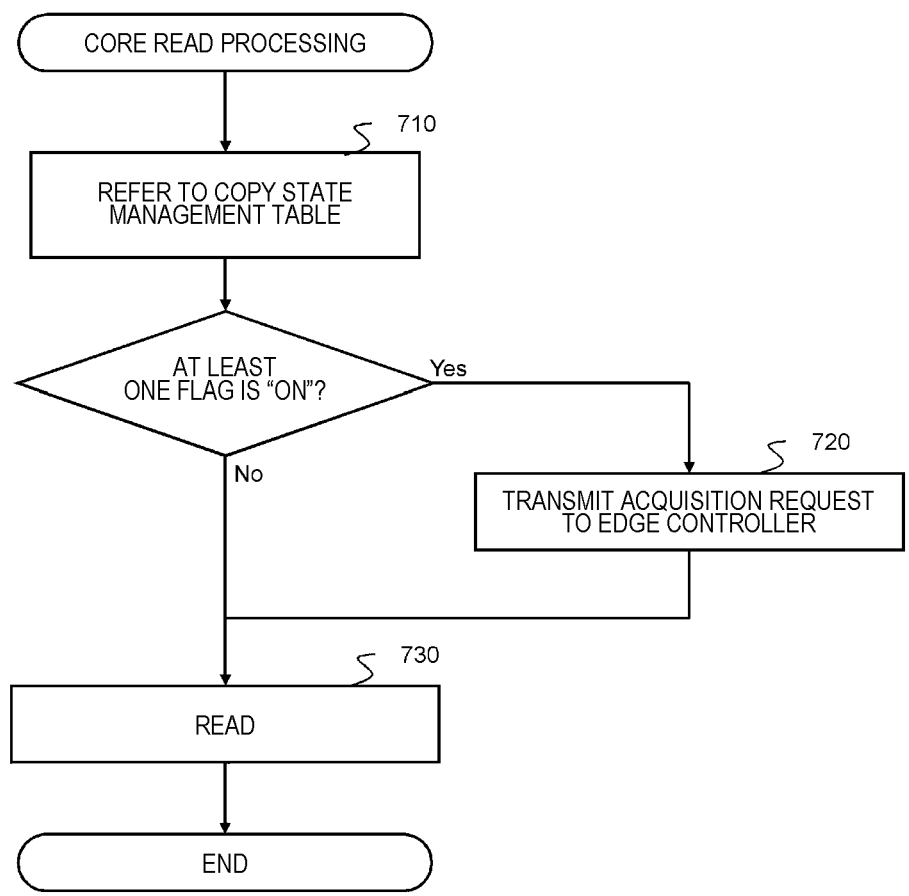
FIG. 11 is a flowchart of core read processing in the first embodiment.

FIG. 11 is a flowchart of core read processing starting when the core controller 240 receives a read request for an LU from the host 230 for analysis.

The core controller 240 refers to the entry in the copy state management table 370 corresponding to the LU and the page of the read target designated by the read request (step 710). When at least one of the uncopied flag 573 and the update flag 572 is "ON" in the entry referred to, the read target data of the LU needs to be acquired from the edge controller 290. In this case, the core controller 240 refers to the LU mapping management table 360, specifies the copy source storage 562, the copy source LU 563, and the copy source generation number 564 corresponding to the LU of the read target, and transmits an acquisition request of the data for the LU and the snapshot to the copy source edge controller 290 (step 720). Then, the core controller 240 writes data acquired from the copy source edge controller 290 in response to the acquisition request to the LU of the read target. By this operation, the core controller 240 sets both the update flag 572 and the uncopied flag 573 in the copy state management table 370 to "OFF" because the contents of the pages of the read target LU and the copy source LU are matched. Then, the core controller 240 reads data in the read target LU (data acquired and stored from the edge controller 290), and returns the data to the host 230 for analysis of the read request source (step 730).

According to the present embodiment, the host 230 for analysis can transparently access data in the edge storage 150. Therefore, the core controller 240 can access the data stored by the edge storage 150 without waiting for completion of copying of the data stored by the edge storage 150. Further, at the time of referring to the data, only the page where the target data is stored is transferred via the wide area network 250, and data not referred to is not transferred. As a result, a transfer amount of the wide area network 250 can be suppressed to shorten a transfer time, and an amount of data copied (acquired) by the core controller 240 from the edge controller 290 (replication amount of the core controller 240) can be reduced. Further, by storing the data copied from the edge controller 290 to the core controller 240 in the LU in the core storage 120, data copying from the edge controller 290 becomes unnecessary in the following access, and degradation of access performance can be suppressed.

In the present embodiment, copying of data from the edge controller 290 to the core controller 240 is performed when a read request is received from the host 230 for analysis and a page designated by the read request is a page of a data acquisition target. However, copying of the data may be performed asynchronously with reception of the read request. In this case, when asynchronous copying is completed with respect to a read source page by the host 230 for analysis for the first time, the latest data is already stored in the page. Therefore, since it is not necessary to acquire the data via the wide area network 250, it can be expected that a read response time can be shortened.

Further, in the present embodiment, if the core controller 240 stores the LU mapping management table 360 and the copy state management table 370, the host 230 for analysis can refer to the data stored in the edge storage 150 via the core controller 240. Actually, it is not necessary to wait for all data held by the edge storage 150 to be copied to the core controller 240. Therefore, even when the core storage 120 is newly connected to the edge storage 150 or when a large amount of data is generated in the edge storage 150, it can be expected that the host 230 for analysis refers to the data of the edge storage 150 immediately.

Second Embodiment

A second embodiment will be described. Hereinafter, a difference with the first embodiment will be mainly described, and the description of the points common to the first embodiment will be simplified or omitted.

As at least one of an edge storage and a core storage, instead of a device receiving an access request designating an LUN and an address (for example, a logical block address (LBA)) shown in the first embodiment and accessing data according to the request, a device performing access in a data set unit such as a file and an object may be adopted. Particularly, a form in which a file storage is disposed in each site and data stored in the file storage is copied to a storage system providing data access in an object unit such as a cloud storage may be taken. In the second embodiment, the above form is adopted. The "data set" is one block of logical electronic data viewed from a program such as an application program, and may be, for example, any one of a record, a file, an object, a key value pair, and a tuple. Further, in the second embodiment, a data set such as a file, a directory, and an object are an example of elements in a volume.

Figure 12:
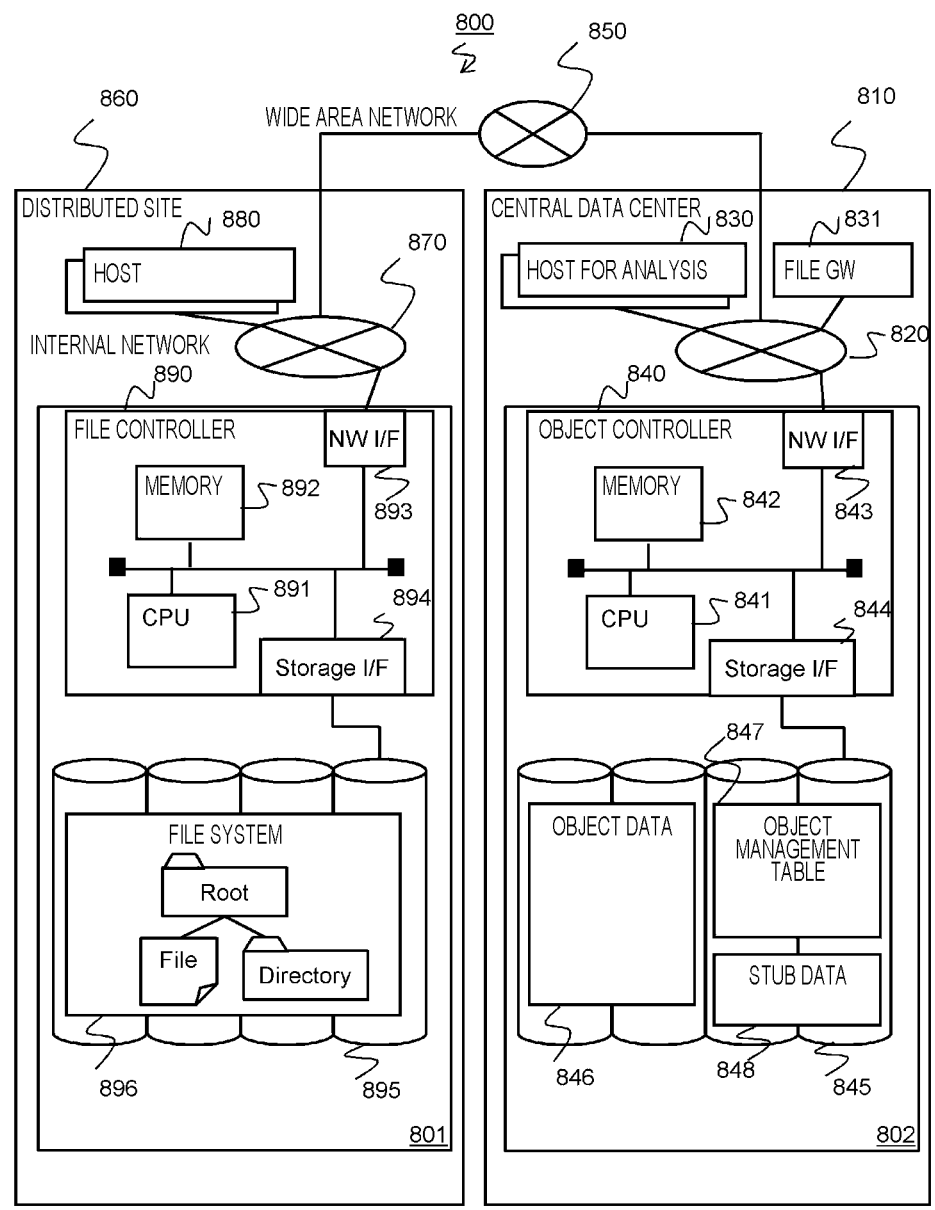
FIG. 12 is a configuration diagram of a computer system in a second embodiment.

FIG. 12 is a configuration diagram of a computer system 800 in the second embodiment.

In a central data center 810 (an example of a second site), an object storage 802 (an example of a second storage device) and one or more hosts 830 for analysis (an example of a second host) are connected via an internal network 820 connected to a wide area network 850. Further, a file gateway 831 may be connected. An object storage 802 is a device that stores and provides data referred to by the host 830 for analysis in an object unit. The object storage 802 has one or more storage media 845 and a controller (hereinafter, referred to as an object controller) 840 for controlling an input/output with respect to one or more storage media 845. The host 830 for analysis is a computer that accesses and processes or analyzes data stored by the object storage 802 and data in a file storage 801 of the distributed site 860 which the object controller 840 can access transparently. When the host 830 for analysis does not have a data access function in an object unit, the host 830 for analysis may indirectly access data stored in the object storage 802 by using the file gateway 831 that converts data access in a file unit and data access in an object unit. Hereinafter, the host 830 for analysis accessing the data in the object storage 802 also includes indirect access via the file gateway 831. If a directory hierarchical structure is stored in the object storage 802 from the file storage 801, the hierarchical structure is not maintained in the object storage 802, but the file gateway 831 holds information representing the hierarchical structure. That is, the file gateway 831 manages a hierarchical structure of objects in the object storage 802. For example, in response to a request (inquiry) designating a path name (file name), the file gateway 831 can return an object ID corresponding to the path name.

The object controller 840 has a function of enabling the host 830 for analysis to transparently access to data stored by a file storage 801 (an example of a first storage device) existing in each distributed site 860 (an example of a first site). The object controller 840 (an example of a second controller) includes a CPU 841, a memory 842, a network interface 843, and a storage interface 844, which are internally connected to each other. The CPU 841 controls components of the object controller 840 according to the description of programs stored in the memory 842. The memory 842 stores a plurality of programs and tables and has a disk cache. The object controller 840 processes an access request by the host 830 for analysis via the network interface 843 and the internal network 820, and communicates with the file controller 890 via the wide area network 850. Further, the object controller 840 reads and writes data from and to a storage medium 845 via the storage interface 844, and stores object data 846, an object management table 847, and stub data 848 in the storage medium 845. These data may be stored by dividing an area of the storage medium 845 as it is by functions such as partitions and logical volume management (LVM), or a file system may be constructed on the storage medium 845 and the data may be stored in a file unit. As a communication protocol via the network interface 843, a representational state transfer (REST) protocol using a hypertext transfer protocol (HTTP) or a protocol of the network interface 243 and the storage interface 244 can be used. Further, as a communication protocol between the storage interface 844 and the storage medium 845, the protocol of the storage interface 244 can be used.

The file storage 801 has one or more storage media 895 and a controller (hereinafter, referred to as a file controller) 890 for controlling an input/output with respect to one or more storage media 895. The file controller 890 (an example of a first controller) includes a CPU 891, a memory 892, a network interface 893, and a storage interface 894, which are internally connected to each other. The CPU 891 controls components of the file controller 890 according to the description of programs stored in the memory 892. The memory 892 stores a plurality of programs and tables and has a page cache. The file controller 890 receives an access request by a host 880 via the network interface 893 and an internal network 870, and communicates with the object controller 840 in the central data center 810 via the wide area network 850. Further, the file controller 890 reads and writes data from and to the storage medium 895 via the storage interface 894, and constructs a file system 896 on the storage medium 895. As each communication protocol of the file controller 890, a protocol equivalent to that of the object controller 840, such as a network file system (NFS) or a server message block (SMB), can be used. Further, as a communication protocol between the storage interface 894 and the storage medium 895, the protocol of the storage interface 244 can be used.

The file system 896 is an example of a first volume. An area where the object data 846 and the stub data 848 are stored is an example of a second volume.

The storage device in each distributed site 860 may be an object storage instead of the file storage. The storage device in the central data center 810 may be a file storage instead of the object storage. Further, the case where one of the distributed site 860 and the central data center 810 is a file or a directory and the other is an object is an example of the case where a type of data set stored by the distributed site 860 is different from a type of data set stored by the central data center 810. If the types of the data sets are different, configurations of IDs of the data sets are different. For this reason, it is necessary to manage a correspondence relation of the IDs of the data sets using, for example, a table shown in FIG. 14 (it is preferable to further use a table shown in FIG. 15 as described later).

Figures 13, 14, 15:
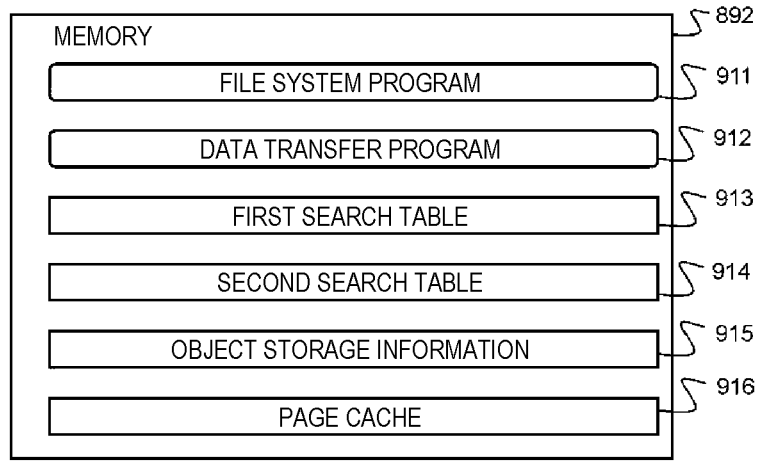
FIG. 13 is a diagram showing programs and tables stored in a memory of a file controller in the second embodiment.
FIG. 14 is a configuration diagram of a first search table in the second embodiment.
FIG. 15 is a configuration diagram of a second search table in the second embodiment.

FIG. 13 is a diagram showing various programs and tables stored in the memory 892 of the file controller 890.

The memory 892 stores a file system program 911, a data transfer program 912, a first search table 913, a second search table 914, and object storage information 915. The memory 892 has a page cache 916. The page cache 916 may be a surplus area of the memory 892 (at least a part of an area other than an area where various programs and tables are stored).

The file system program 911 is a program that constructs a file system on the storage medium 895 and realizes data access and data storage in a directory or file unit. Further, the file system program 911 responds to a file access request (access request to a directory or a file by the host 880) via the internal network 870. As a protocol for the file access request via the network, a network file system (NFS), a server message block (SMB), an apple filing protocol (AFP), or the like can be used as described above.

The data transfer program 912 is a program for performing transmission and reception of data with the object storage 840 existing in the central data center 810.

FIG. 14 is a configuration diagram of the first search table 913.

The first search table 913 is a table indicating a correspondence relation between a directory or a file on the file system and an object in the object storage 802, and is a table for searching an object ID from a file path name. The first search table 913 has an entry for each directory or file. Each entry stores information such as a path name 921, a type 922, and an object ID 923. Hereinafter, one data set (directory or file) is taken as an example (referred to as a "target data set" in the description of FIG. 14).

The path name 921 indicates a path name to the target data set. The path name 921 may be an example of an ID of the target data set. The type 922 indicates a type ("/" (root directory), "directory", or "file") of the target data set. The object ID 923 is an ID for uniquely specifying an object corresponding to the target data set.

By using the first search table 913, it is possible to transmit an update notification including an object ID corresponding to the file or the directory. The first search table 913 is managed in such a manner that an entry can be searched from the path name 921 at high speed, by holding an index such as a hash value for the path name 921.

FIG. 15 is a configuration diagram of the second search table 914.

The second search table 914 is a table indicating a correspondence relation between an object and a directory or a file, and is a table for searching a path name from an object ID. The second search table 914 has an entry for each object. Each entry stores information such as an object ID 931 and a path name 932. Hereinafter, one object is taken as an example (referred to as a "target object" in the description of FIG. 15).

The object ID 931 is an ID of the target object. The path name 932 indicates a path name to a data set corresponding to the target object.

By using the second search table 914, it is possible to specify a file or a directory corresponding to the object ID at high speed in response to an acquisition request designating the object ID. The second search table 914 is managed in such a manner that an entry can be searched from the object ID 931 at a high speed, by holding an index such as a hash value for the object ID 931.

Since the first search table 913 and the second search table 914 are tables including the same contents, the first search table 913 and the second search table 914 may be shared by one table if the entry can be searched at high speed by both the path name and the object ID.

FIG. 16 is a diagram showing various programs and tables stored in the memory 842 of the object controller 840.

The memory 842 stores an object control program 1011, an object management table 1012, and a stub data table 1013. The memory 842 has a disk cache 1014. The disk cache 1014 may be a surplus area of the memory 842 (at least a part of an area other than an area where various programs and tables are stored).

The object control program 1011 is a program that performs data input/output in an object unit and responds to an access request from the host 830 for analysis. The object controller 840 can also classify objects in units called a plurality of buckets instead of managing all objects uniformly. In this case, the host 830 for analysis specifies an access target by a pair of a bucket ID and an object ID.

FIG. 17 is a configuration diagram of the object management table 1012.

The object management table 1012 is a table indicating information of objects managed by the object control program 1011. The object management table 1012 has an entry for each object. Each entry stores information such as object ID 1021, an update flag 1022, a stub flag (equivalent to an uncopied flag) 1023, a size 1024, and a storage destination 1025. Hereinafter, one object is taken as an example (referred to as a "target object" in the description of FIG. 17). If the object has other attributes (for example, attributes such as object creation date and time, owner, and access right), the object management table 1012 may have corresponding columns.

The object ID 1021 is an ID of the target object.

The update flag 1022 indicates whether or not an update notification including the ID of the target object has been transmitted from the file controller 890 to the object controller 840, after data copying last time of the target object from the file storage 801 to the object storage 802.

The stub flag 1023 indicates whether or not the target object is uncopied from the file storage 801 to the object storage 802 (whether or not the stub exists instead of the target object), after creating the LU (object storage space).

The storage destination 1025 indicates a storage position of data of the target object (a position in the storage medium 845). As the storage destination 1025, the path name of the file system, the LBA on the LU, and the like are stored.

The object management table 1012 may exist for each bucket, or a column of bucket IDs may be added on one object management table 1012 and an entry (row) on the object management table 1012 may be specified by a pair of a bucket ID and an object ID.

FIG. 18 is a configuration diagram of the stub data table 1031.

The stub data table 1031 has an entry for each object. Each entry stores information such as a bucket ID 1031, an object ID 1032, and a data acquisition destination 1033. Hereinafter, one object is taken as an example (referred to as a "target object" in the description of FIG. 18).

The bucket ID 1031 is an ID of a bucket for storing the target object. The object ID 1032 is an ID of the target object. The data acquisition destination 1033 indicates a position (a position on the file storage 801) at which a data set corresponding to the target object is stored. The data acquisition destination 1033 is represented by, for example, a combination of an identifier of the file storage 801 and a file sharing name on the file storage 801 or the like.

The stub data table 1031 may have a format other than that shown in the figure as long as it indicates a correspondence relation between the object and the data acquisition destination. For example, if all objects in the bucket are associated with the same data acquisition destination, a column of the object ID 1032 is unnecessary. By the stub data table 1013, data can be acquired transparently from the file storage 801 indicated by the data acquisition destination 1033, when the host 830 for analysis performs access.

Figure 19:
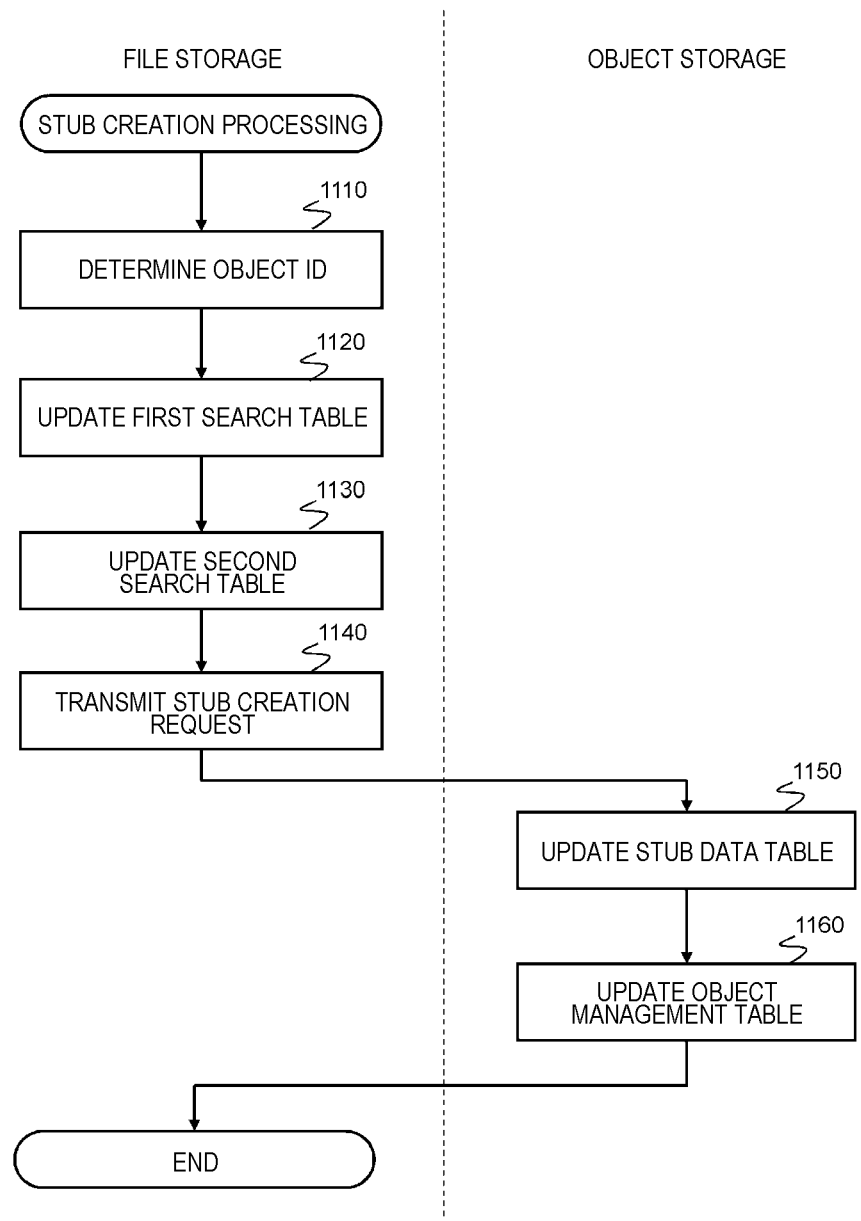
FIG. 19 is a flowchart of stub creation processing in the second embodiment.

FIG. 19 is a flowchart of stub creation processing.

The stub creation processing is processing executed when the file storage 801 registers stub data corresponding to a file or a directory held by the file storage 801 in the object storage 802. For example, when a new file is added to the file storage 801, the stub creation processing may be executed, or the stub creation processing may be executed collectively for a group of files (one or more files) created during a corresponding period (for example, one day) every a constant period (for example, every day). Hereinafter, the stub creation processing is executed for one data set (file or directory) ("target data set" in FIG. 19). However, the file controller 890 can also execute a plurality of stub creation processing in parallel or in series to complete stub creation for a plurality of files or directories.

The file controller 890 determines an object ID when the target data set is stored by the object controller 840 (step 1110). The object ID may be generated by the file controller 890 or the object controller 840 as long as uniqueness is maintained. If the file controller 890 acquires the determined object ID, the file controller 890 adds an entry storing the path name 921, the type 923, and the object ID 924 corresponding to the target data set to the first search table 913 (step 1120). Similarly, the file controller 890 adds an entry storing the path name 931 and the object ID 932 corresponding to the target data set to the second search table 914 (step 1130). Next, the file controller 890 transmits, to the object controller 840, a stub creation request (a request to create a stub of the object) in which the determined object ID and the attribute (size or the like) of the object are associated (step 1140).

When the object controller 840 receives a stub creation request by the file controller 890, the object controller 840 creates an entry of the corresponding stub data table 1031 in response to the stub creation request (step 1150). In the entry created in step 1150, the object ID 1021 associated with the stub creation request is stored.

Next, the object controller 840 creates an entry of the object management table 1012 (step 1160). In the entry created in step 1160, the object ID 1021 and the size 1024 associated with the stub creation request by the file controller 890 are stored. Further, in the entry created in step 1160, the update flag 1022 is set to "OFF" and the stub flag 1023 is set to "ON".

In this way, in response to the stub creation request from the file controller 890, the object controller 840 creates a stub that is a stub of the object designated in the stub creation request and is recognized by the host 830 for analysis.

Figure 20:
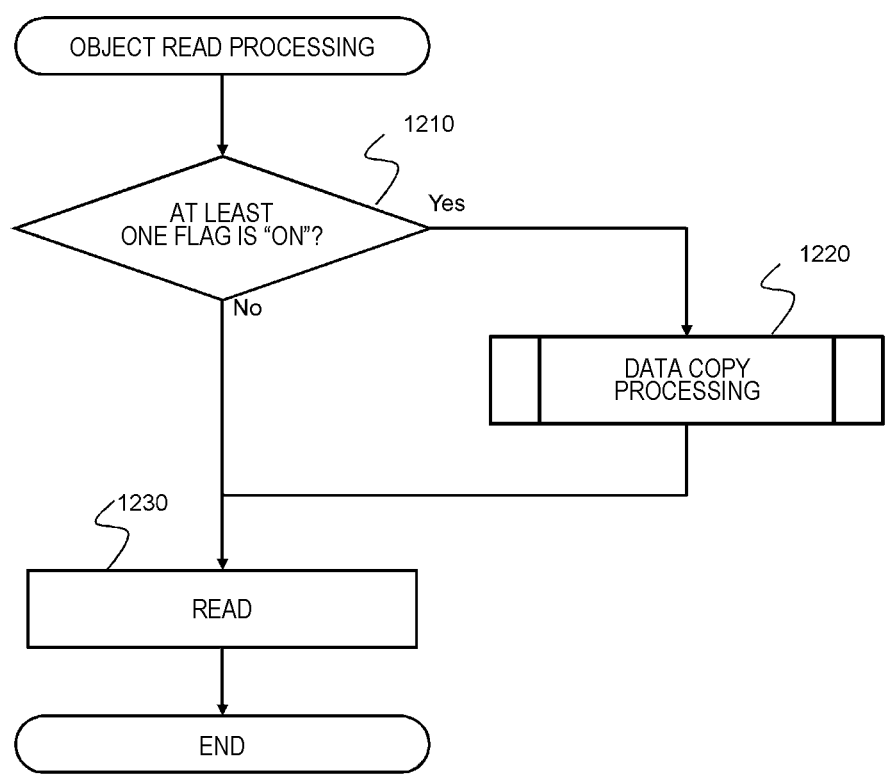
FIG. 20 is a flowchart of object read processing in the second embodiment.

FIG. 20 is a flowchart of object read processing performed when the object controller 840 receives an object acquisition request from the host 830 for analysis or the file gateway 831.

When the object controller 840 receives the object acquisition request, the object controller 840 refers to the object management table 1012 using the object ID included in the acquisition request, and determines whether or not at least one of the update flag 1022 and the stub flag 1023 of the target object (object specified from the object ID included in the acquisition request) is "ON" (step 1210). For example, when the update flag 1022 is "ON", this means that an update notification has been received from the file controller 890 because the file or directory corresponding to the target object is updated on the file storage 801. As a method of the notification, a method of transmitting a list of updated object IDs from the file controller 890 to the object controller 840 is considered. After receiving the transmission, the object controller 840 sets the update flag corresponding to the object ID in the object management table 1012 to "ON", for each object ID included in the list. Further, when the stub flag 1023 is "ON", this means that data of the file or the directory corresponding to the object data 846 is not held. Therefore, when at least one of the update flag 1022 and the stub flag 1023 is "ON", this means that it is necessary to acquire data of the object from the file storage 801. In this case, the object controller 840 starts the data copy processing (FIG. 21) so that the object data 846 is matched with the data of the file or the directory in the file system 896 (step 1220). Thereafter, the object controller 840 reads the data 846 of the target object, and returns the read data to a transmission source of the object acquisition request (step 1230).

Figure 21:
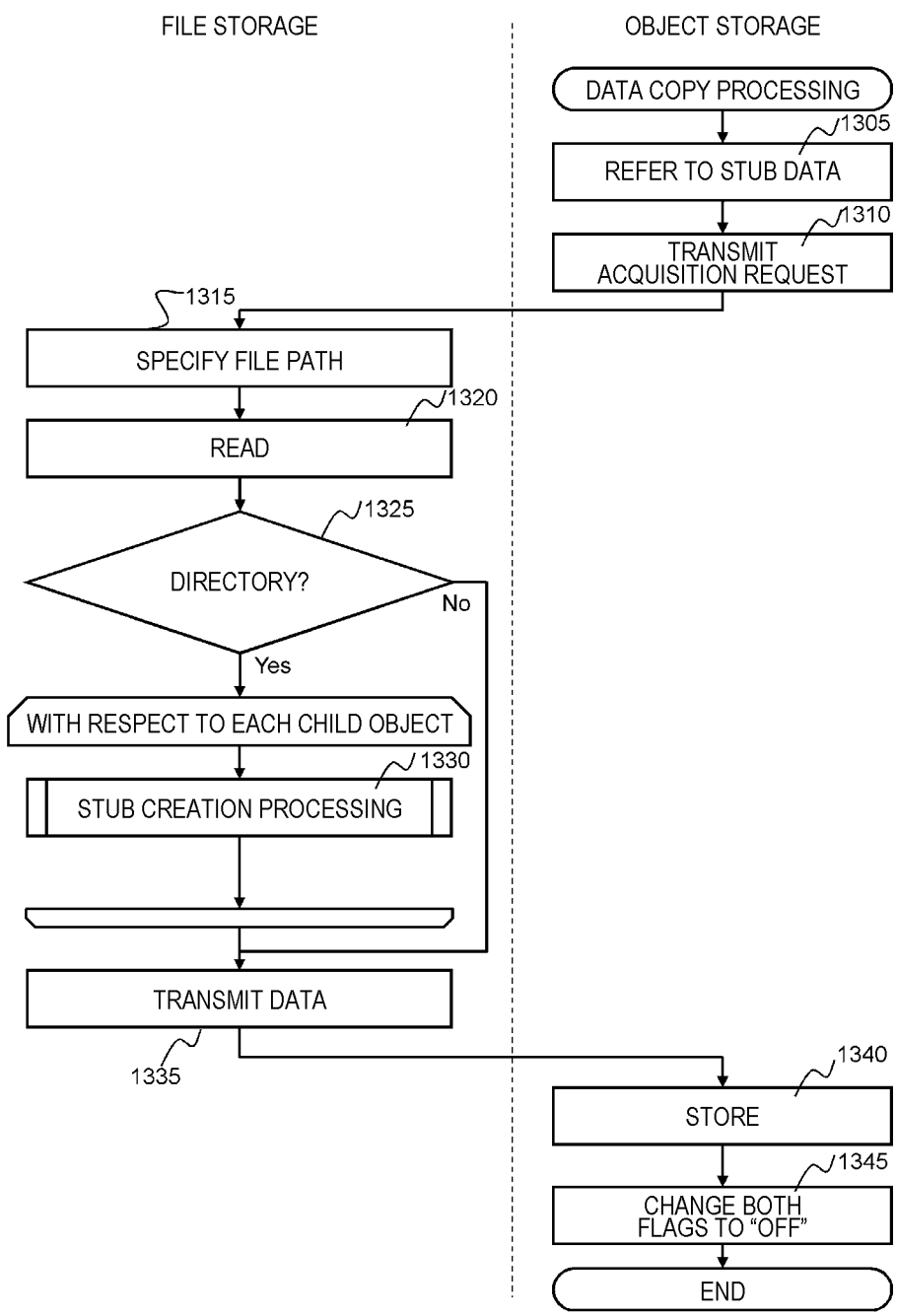
FIG. 21 is a flowchart of data copy processing in the second embodiment.

FIG. 21 is a flowchart of data copy processing. The data copy processing may be performed during the object read processing, or may be performed in the background when the object controller 840 performs other processing.

The object controller 840 refers to the stub data table 1013 and specifies the corresponding data acquisition destination 1033 using the object ID of the target object (processing target object) and the bucket ID of the bucket in which the target object is stored (step 1305). The object controller 840 transmits an acquisition request associated with the object ID as an argument to the file controller 890 of the data acquisition destination 1033 acquired in step 1305 (step 1310).

The file controller 890 that has received the acquisition request specifies the path name 932 of the file or the directory corresponding to the target object using the second search table 914, on the basis of the object ID of the argument (step 1315), and reads the data of the file or the directory according to the specified path name 932 from the file system 896 (step 1320). When the destination indicated by the path name 932 is a directory, the file controller 890 performs the stub creation processing on all child data sets (each file and sub-directory) stored in the directory (steps 1325 and 1330). That is, a stub of each of all the data set in the directory is created on the file system. As a result, an object of the object storage 802 can be used to restore a name space (hierarchical structure) in the file storage 801.

Then, the file controller 890 returns data (in the case of the directory, the "data" means a list of pairs of file names and sub-directory names (path names) and corresponding object IDs as information of files and sub-directories stored in the directory) of the file or the directory corresponding to the path name to the object storage 840 (step 1335).

When the object controller 840 receives a response from the file controller 890, the object controller 840 writes the received data as the object data 846 (step 1340). Next, the object controller 840 sets the update flag 1022 and the stub flag 1023 of the object management table 1012 to "OFF" (step 1345).

According to the present embodiment, the host 830 for analysis can transparently access the data stored by the file storage 801 in the distributed site. As a result, the host 830 for analysis can refer to the data of the file storage 801 without waiting for completion of data copying from the file storage 801 to the object storage 802. Further, at the time of referring to the data, only the object where the target data is stored is transferred between the distributed site 860 and the central data center 810 via the wide area network 850, and data not referred to is not transferred. As a result, a transfer amount of the wide area network 850 can be suppressed to shorten a transfer time, and an amount of data copied (acquired) by the object storage 802 from the file storage 801 (replication amount of the object storage 802) can be reduced.

Further, in the present embodiment, when the object controller 840 receives a read request of an object corresponding to the directory, the object controller 840 constructs stub data of files and sub-directories in the directory. Therefore, if only stub data corresponding to a root directory is stored, the object controller 840 can create stub of the components of the path recursively and performs the data copy processing, with respect to the data acquisition request from the host 830 for analysis or the file gateway 831. Therefore, even when the object storage 802 is newly connected to the file storage 801 or when a large amount of files (and directories) are generated in the file storage 801, it can be expected that the host 830 for analysis or the file gateway 831 refers to the file or the directory of the file storage 801 immediately, without waiting for data copying from the file storage 801 to the object storage 802.

Third Embodiment

A third embodiment will be described. Hereinafter, a difference with the first embodiment will be mainly described, and the description of the points common to the first embodiment will be simplified or omitted.

In a computer system, data may migrate from an old storage device to a newly purchased storage device. In the present embodiment, even when a storage system processing an access request designating an LUN and an address (for example, an LBA) is in the middle of the data migration, the same effect as that of the first embodiment is realized.

Figure 22:
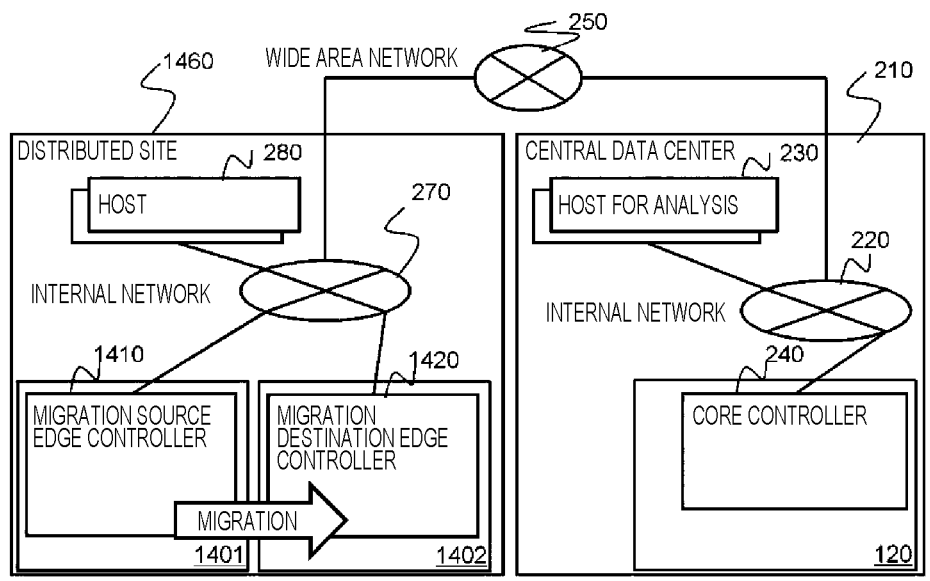
FIG. 22 is a configuration diagram of a computer system in a third embodiment.

FIG. 22 is a configuration diagram of a computer system 1400 in the third embodiment.

The computer system 1400 includes a central data center 210 and one or more distributed sites 1460. The central data center 210 and the distributed site 1460 are connected to each other by a wide area network 250. The central data center 210 has the same configuration as that of the first embodiment. The distributed site 1460 has almost the same configuration as a distributed site 260 in the first embodiment. However, as edge controllers, there are a migration source edge controller (edge controller of a migration source edge storage 1401) 1410 and a migration destination edge controller (edge controller of a migration destination edge storage 1402) 1420. An example of the migration source edge storage 1401 is an old storage device. An example of the migration destination edge storage 1402 is a new storage device.

The migration source edge controller 1410 and the migration destination edge controller 1420 can communicate with each other via an internal network 270. It is assumed that data and an LU configuration stored by the migration source edge storage 1401 are migrating to the migration destination edge storage 1402. For data migration between the controllers 1410 and 1420, a method shown in PTL 3 is applicable. If data migration according to the method shown in PTL 3 is used, even in a state in which the data migration from the migration source edge controller 1410 to the migration destination edge controller 1420 is not completed, a host 280 can transparently refer to the data of the migration source edge storage 1401 via the migration destination edge storage 1402.

Processing of step 720 of core read processing of FIG. 11 is applicable to the data migration from the migration source edge controller 1410 to the migration destination edge controller 1420. A copy source storage 532 and a copy source LUN 563 in an LU mapping management table 360 held by a core controller 240 are set to refer to an LU on the migration destination edge controller 1420. In this case, a data acquisition request of the core controller 240 is transmitted to the migration destination edge controller 1420. The migration destination edge controller 1420 has a function of causing the host 280 to transparently refer to the data of the migration source edge storage 1401. Similarly, the migration destination edge controller 1420 applies the function of transparently referring to the data of the migration source edge storage 1401 to the data acquisition request from the core controller 240, thereby acquiring the data in the migration source edge storage 1401.

According to the present embodiment, even in the middle of the data migration between the edge storages 1401 and 1402 in the distributed site 1460, a host 230 for analysis in the central data center 210 can refer to the data in the distributed site 1460 via the core controller 240 regardless of a location of the data between the migration source edge storage 1401 and the migration destination edge storage 1402.

In the present embodiment, the migration source edge storage 1401 may exist outside the distributed site 1460. The migration source edge storage 1401 is an example of a third storage device. When the migration destination edge storage 1402 receives an acquisition request from the core storage 120 in the middle of the data migration from the migration source edge storage 1401 to the migration destination edge storage 1402, the migration destination edge storage 1402 determines whether or not the latest data of an acquisition target according to the acquisition request has migrated to the migration destination edge storage 1402. When a determination result is true, the migration destination edge storage 1402 returns the latest data to the core storage 120. When the determination result is false, the migration destination edge storage 1402 acquires the latest data from the migration source edge storage 1401 and returns the latest data to the core storage 120.

Fourth Embodiment

A fourth embodiment will be described. Hereinafter, a difference with the second embodiment will be mainly described, and the description of the points common to the second embodiment will be simplified or omitted.

The present embodiment is an embodiment of the case where data migrates between file storages in an distributed site.

Figure 23:
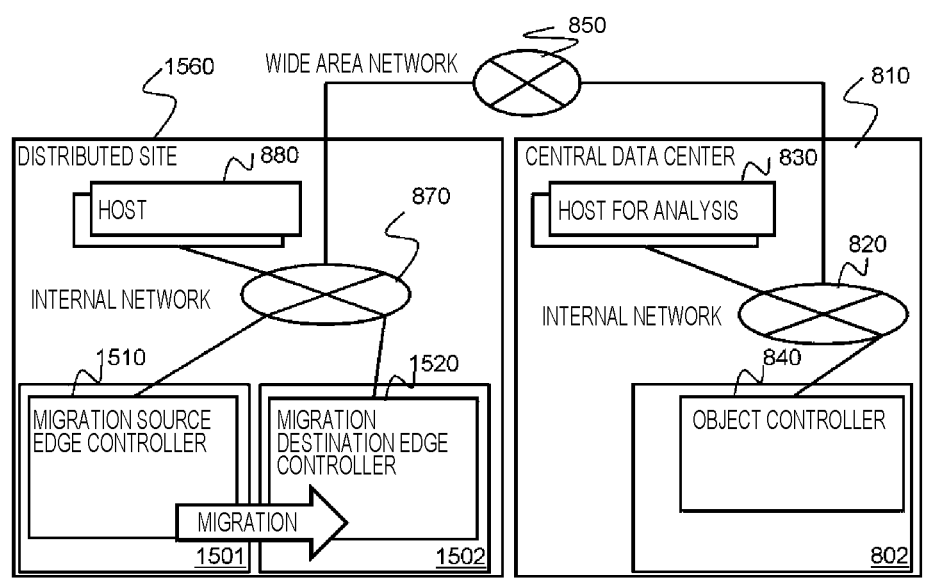
FIG. 23 is a configuration diagram of a computer system in a fourth embodiment.

FIG. 23 is a configuration diagram of a computer system 1500 in the fourth embodiment.

The computer system 1500 includes a central data center 810 and one or more distributed sites 1560. The central data center 810 and the distributed site 1560 are connected to each other by a wide area network 850. The central data center 810 has the same configuration as that of the second embodiment. The distributed site 1560 takes almost the same configuration as a distributed site 860 in the second embodiment. However, as file storages, there are a migration source file storage 1501 and a migration destination file storage 1502. The migration source file storage 1501 includes a controller (hereinafter, referred to as a migration source file controller) 1510. The migration destination file storage 1502 includes a controller (hereinafter, referred to as a migration destination file controller) 1520.

The migration source file controller 1510 and the migration destination file controller 1520 can communicate with each other via an internal network 870. It is assumed that files and directories are migrating from the migration source file controller 1510 to the migration destination file controller 1520. For data migration between the file controllers 1510 and 1520, a method shown in PTL 4 is applicable. If data migration according to the method shown in PTL 4 is used, even in a state in which the data migration from the migration source file controller 1510 to the migration destination file controller 1520 is not completed, a host 880 can transparently refer to the data of the migration source file storage 1501 via the migration destination file storage 1502.

The migration destination file controller 1520 stores, in a memory, a migration stub data table 1600 shown in FIG. 24 and a data request source management table 1650 shown in FIG. 25, in addition to tables in the second embodiment.

FIG. 24 is a configuration diagram of the migration stub data table 1600.

The migration stub data table 1600 shows a correspondence relation between a file or a directory on the migration source file storage 1501 and a file or a directory on the migration destination file storage 1502. The migration stub data table 1600 has an entry for each data set (file, directory, or stub) on the migration destination file storage 1502. Each entry stores information such as a file path 1601, a data migration source 1602, a file path 1603, and a stub flag 1604. Hereinafter, one data set is taken as an example (referred to as a "target data set" in the description of FIG. 24).

The file path 1601 indicates a path name of a target data set. The data migration source 1602 indicates an identifier that uniquely identifies the migration source file storage 1501 storing a migration source data set of the target data set. The file path 1603 indicates the path name of the migration source data set of the target data set (a file path on the migration source file storage 1501). The stub flag 1604 indicates whether or not replication data of the target data set is stored in a file system of the migration destination file storage 1502 itself. The stub flag 1604 may be included in a first search table 913.

FIG. 25 is a configuration diagram of the data request source management table 1650.

The data request source management table 1650 is a table that is temporarily stored on the memory until the migration destination file storage 1502 returns a response, when the host 880 or an object controller 840 transmits a file access request to the migration destination file storage 1502. The data request source management table 1650 has an entry for each file access request. Each entry stores information such as a request destination file path name 1651 and a request source 1652 indicating an identifier of a transmission source of the file access request. As the identifier, for example, an IP address, a WWN, a host name, or the like can be used.

Figure 26:
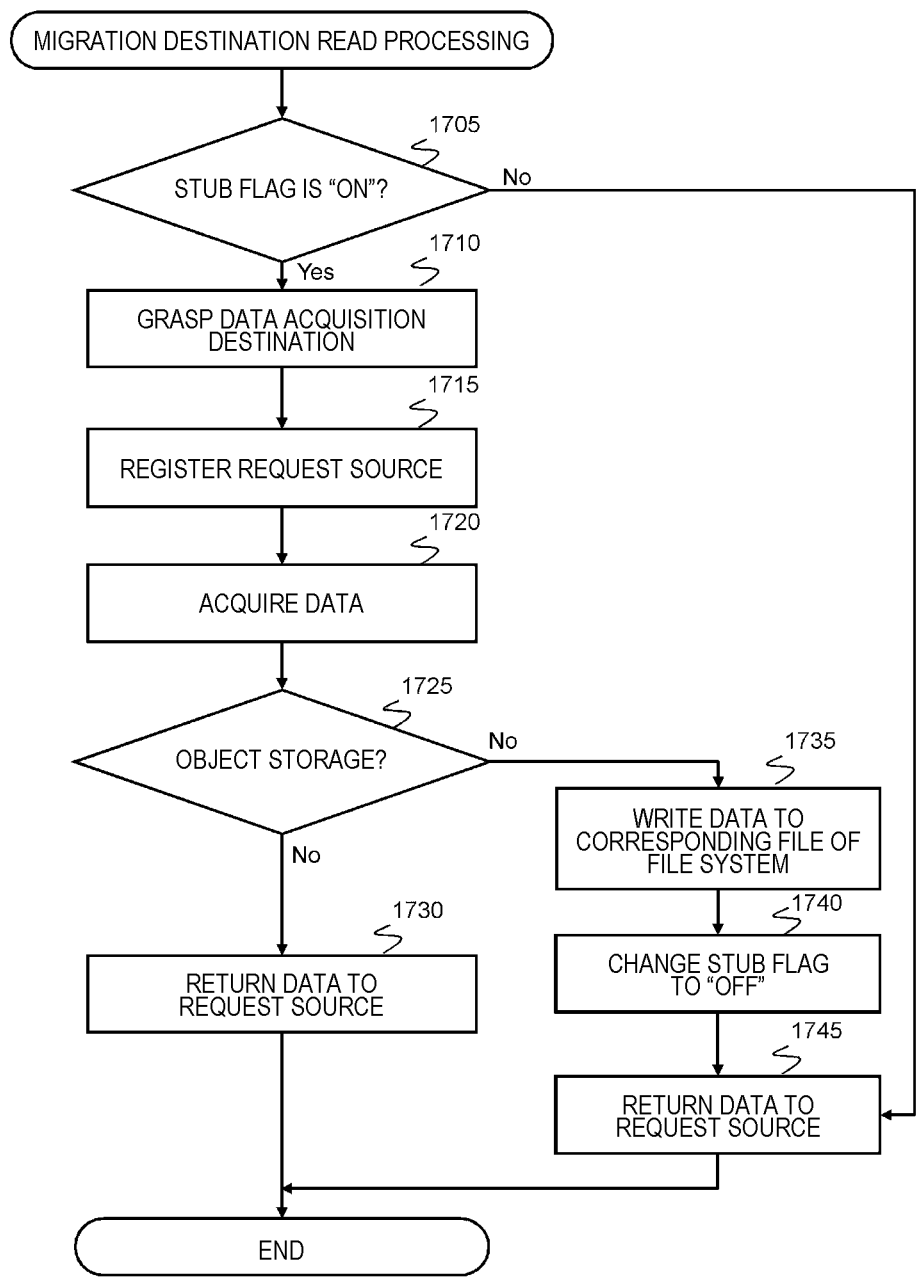
FIG. 26 is a flowchart of migration destination read processing in the fourth embodiment.

FIG. 26 is a flowchart of migration destination read processing.

The migration destination read processing is executed by the migration destination file controller 1520 when the migration destination file controller 1520 receives a file read request from the host 880 or the object controller 840. Alternatively, the migration destination read processing is executed as step 1320 in the data copy processing.

When the migration destination file controller 1520 receives the file read request, the migration destination file controller 1520 refers to the stub flag 1604 corresponding to the file path 1601 corresponding to the read request from the migration stub data table 1600 (step 1705).

When the stub flag 1604 referred to is "OFF", the same data as that of the migration source file storage 1501 is stored on the file system of the migration destination file storage 1502, so that the migration destination file controller 1520 returns the data on the file system of the migration destination file storage 1502 to a request source (step 1745).

When the stub flag referred to is "ON", the same data as that of the migration source file storage 1501 is not stored on the file system of the migration destination file storage 1502, so that the migration destination file controller 1520 transmits a data acquisition request to the migration source file storage 1501. Therefore, the migration destination file controller 1520 refers to the data migration source 1602 and the migration source file path 1603 in the migration stub data table 1600, and specifies the migration source file storage 1501 and the file of the migration source file storage 1501 corresponding to the read target file (file designated by the file read request) (step 1710). Next, the migration destination file controller 1520 registers the request destination file 1651 and the file request source 1652 corresponding to the read target file in the data request source management table 1650 (step 1715). Then, the migration destination file controller 1520 acquires the data of the file (or the directory) corresponding to the read target file from the migration source file storage 1501 (step 1720). Next, the migration destination file controller 1520 refers to the request source 1652 of the data request source management table 1650 registered in step 1715, and determines whether or not the request source is the object storage 802 outside the distributed site 1560 (step 1725).

When the request source is the object storage 802, the migration destination file controller 1520 returns the data of the migration source file storage 1501 acquired in step 1720 as it is (without storing it in the file system of the migration destination file storage 1502) to the request source (step 1730).

When the request source is not the object storage 802, the migration destination file controller 1520 temporarily writes the data of the migration source file storage 1501 acquired in step 1720 to the file storage of the migration destination file storage 1502 (step 1735), and sets the stub flag 1604 on the migration stub data table 1600 to "OFF" (step 1740). Then, the migration destination file controller 1520 returns the data written to the file system to the request source (step 1745). In step 1745, the migration destination file controller 1520 may return the data of the migration source file storage 1501 acquired in step 1720 as it is, similar to step 1730. In this case, a file system access count can be reduced.

According to the present embodiment, even in the middle of the data migration between the file storages 1501 and 1502 in the distributed site 1560, a host 830 for analysis can refer to the data in the distributed site 1560 via the object storage 802 regardless of a location of the data between the migration destination file storage 1502 and the migration source file storage 1501. Further, the migration destination file controller 1520 recognizes whether the file request source is in the distributed site 1560 or the object storage 802, and determines whether or not to write the data acquired from the migration source file storage 1501 to its own file system thereof. As a result, with respect to a request from the object storage 802, the data acquired from the migration source file storage 1501 is controlled not to be written to its own file system, so that it can be expected that the count of access (input/output) executed by the migration destination file controller 1520 in response to a request from the object storage 802 is reduced, and an influence of the request from the object storage 802 on access performance of the host 880 is suppressed.

In the present embodiment, the migration source file storage 1501 may exist outside the distributed site 1560. The migration source file storage 1501 is an example of a third storage device.

Fifth Embodiment

A fifth embodiment will be described. Hereinafter, a difference with the first embodiment will be mainly described, and the description of the points common to the first embodiment will be simplified or omitted. Although the description of the fifth embodiment is mainly made in comparison with the first embodiment, in the description of the fifth embodiment, an "edge storage" and an "edge controller" can be replaced by a "file storage" and a "file controller". Further, a "core storage" and a "core controller" can be replaced by an "object storage" and an "object controller".

In the first embodiment (and the second to fourth embodiments), when a host 230 for analysis accesses data, a core controller 240 copies (acquires) data from an edge storage 150 on demand. Therefore, when the host 230 for analysis accesses a large amount of data in a short time, in the case where the update flag of these data is "ON", a large capacity of data can be copied from the edge storage 150 to a core storage 120 by an extension. When a network bandwidth between each distributed site 260 and a central data center 210 is narrow, it takes a long time to copy data, and performance of analysis processing executed by the host 230 for analysis may be degraded.

Therefore, in the present embodiment, in order to prevent this, data updated in the edge storage 150 is immediately copied to the core storage 120, so that a large capacity of data can be suppressed from being copied at one time, between each distributed site 260 and the central data center 210. At this time, immediately before the analysis processing is executed by the host 230 for analysis, a snapshot is created by the core controller 240, thereby preventing occurrence of that data access of the host 230 for analysis and data copying from the edge storage 150 to the core storage 120 collide and consistency of the data accessed by the host 230 for analysis is lost.

Figure 27:
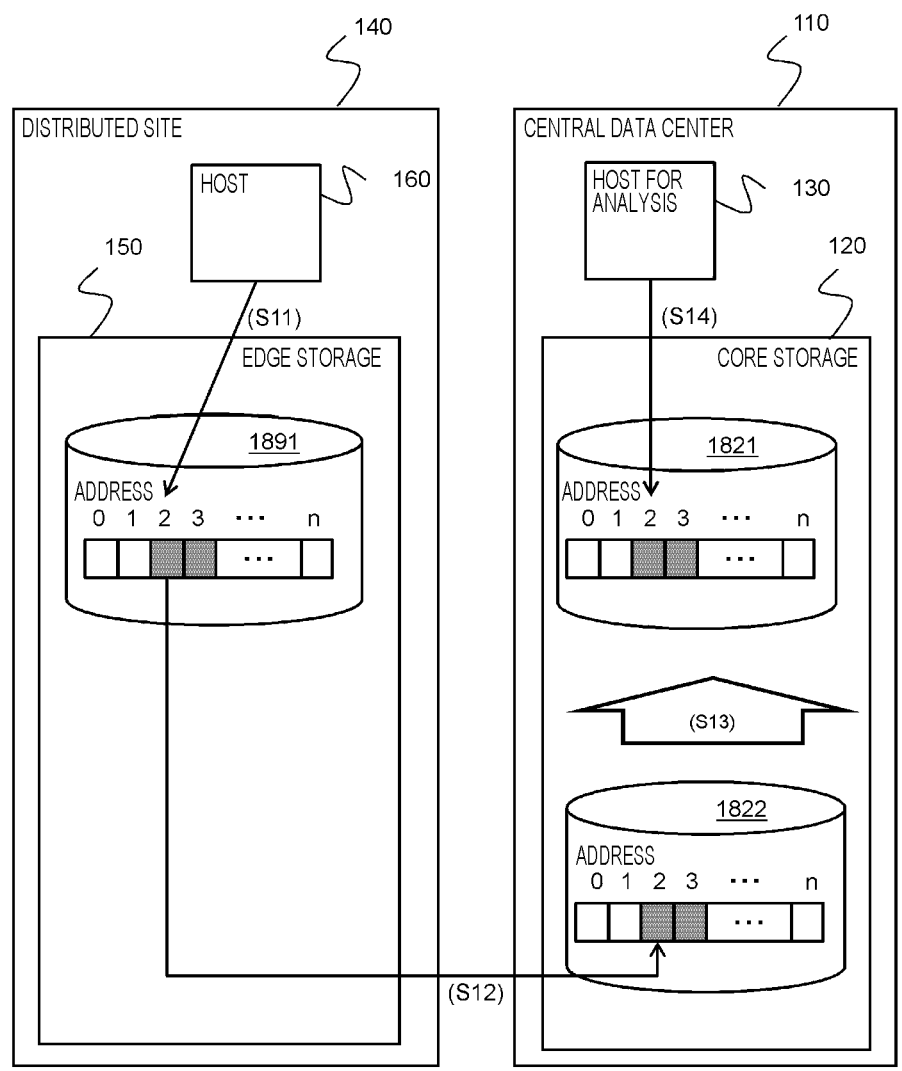
FIG. 27 is a schematic diagram showing an outline of a fifth embodiment.

FIG. 27 is a schematic diagram showing an outline of the fifth embodiment.

An edge controller 290 does not create a snapshot of a volume 1891. When the volume 1891 (an example of a first volume) is updated, the edge controller 290 sends differential data (data as a difference between a pre-update volume and a post-update volume) to the core controller 240. The core controller 240 stores the received differential data in a copy volume 1822 (an example of a third volume), and creates a reference volume 1821 (an example of a second volume) as a snapshot of the volume 1822. The host 230 for analysis performs analysis with reference to the reference volume 1821.

An LU mapping management table in the present embodiment is stored in a memory 292 in the edge controller 290. Further, the LU mapping management table has a configuration different from that of an LU mapping management table 360 in the first embodiment.

Figures 28, 29:
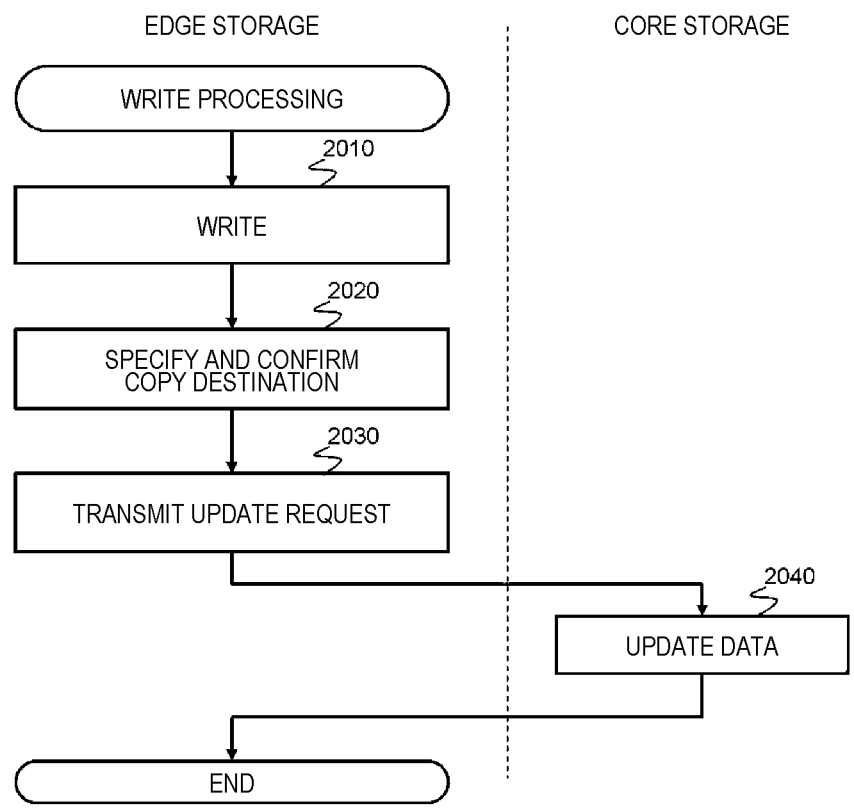
FIG. 28 is a configuration diagram of an LU mapping management table in the fifth embodiment.
FIG. 29 is a flowchart of write processing in the fifth embodiment.

FIG. 28 is a configuration diagram of an LU mapping management table 1900 in the present embodiment.

The LU mapping management table 1900 has an entry for each LU held by an edge storage 150. Each entry stores information such as a LUN 1901, a copy destination storage 1902, and a copy destination LUN 1903. Hereinafter, one LU is taken as an example (referred to as a "target LU" in the description of FIG. 28).

The LUN 1901 is an LUN of the target LU. The copy destination storage 1902 is an identifier that uniquely indicates a core storage 120 of the copy destination. The copy destination LUN 1903 is a LUN of the copy volume 1822 of the copy destination. An IP address or a WWN can be used as an identifier that uniquely indicates the core storage 120 of the copy destination.

In the present embodiment, operations and table types of programs stored in the memory 242 in the core controller 240 and the memory 292 in the edge controller 290 are different from those in the first embodiment. In the present embodiment, a snapshot management table 330 is stored in the memory 242 in the core controller 240, and the LU mapping management table 1900 is stored in the edge controller 290 as described above. Further, a copy state management table 370 requires neither the memory 242 nor the memory 292.

FIG. 29 is a flowchart of write processing started by the edge controller 290 when the edge controller 290 receives a write request from a host 280.

The edge controller 290 writes the data according to the write request to the volume managed by the edge controller 290 (the volume designated by the write request) (step 2010). Next, the edge controller 290 refers to the LU mapping management table 1900 on the basis of the LUN of the write destination volume, and specifies the corresponding copy destination storage 1902 and copy destination LUN 1903 (step 2020). Next, the edge controller 290 transmits a write request in which the specified LUN, the write destination address (for example, the address designated by the write request), the write size (size of the write target data), and the write target data (data according to the write request) are associated, to the core controller 240 corresponding to the specified copy destination storage 1902 (step 2030).

When the core controller 240 receives the write request, the core controller 240 writes the write target data in an area to which the address associated with the write request belongs, of the copy volumes 1822 corresponding to the LUN associated with the write request (step 2040).

Steps 2020, 2030, and 2040 may be performed before returning a response to the write request to the host 280, or may be performed after the response.

The core controller 240 can create a snapshot at any timing regardless of the behavior of the edge controller 290. For example, operations such as creating a snapshot at every constant time are considered. Conversely, the core controller 240 may create a snapshot in conjunction with the operation of the edge controller 290 or the host 280. For example, when the host 280 writes a series of data, an operation such as performing communication between the host 280 and the core controller 240, performing a notification of a state in which data consistency is taken, and performing writing at that timing is considered.

Sixth Embodiment

A sixth embodiment will be described. Hereinafter, a difference with the first and fifth embodiments will be mainly described, and the description of the points common to the first and fifth embodiments will be simplified or omitted. Although the description of the sixth embodiment is mainly made in comparison with the first and fifth embodiments, in the description of the sixth embodiment, an "edge storage" and an "edge controller" can be replaced by a "file storage" and a "file controller". Further, a "core storage" and a "core controller" can be replaced by an "object storage" and an "object controller".

Figure 30:
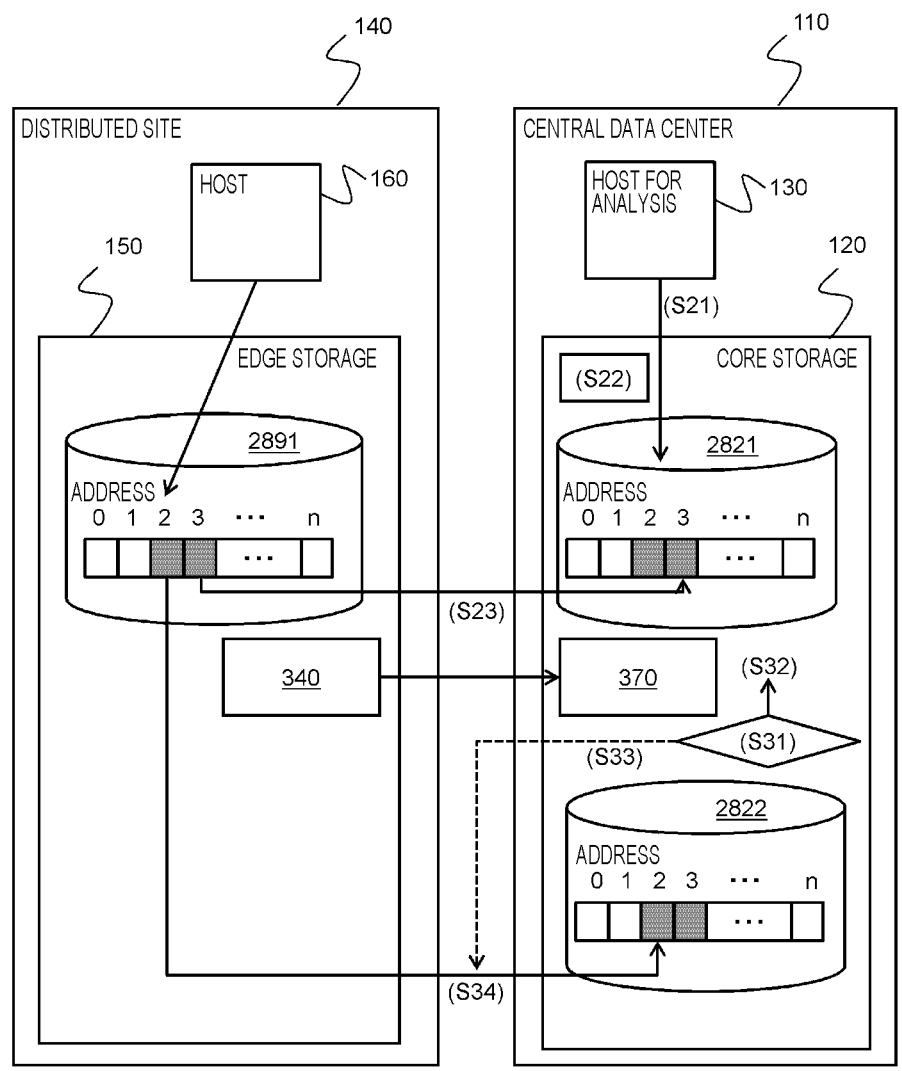
FIG. 30 is a schematic diagram showing an outline of a sixth embodiment.

FIG. 30 is a schematic diagram showing an outline of the sixth embodiment.

In the sixth embodiment, a core controller 240 uses both on-demand type data copying (copying data from a distributed site 140 in response to a read request from a host 130 for analysis) as in the first embodiment (and the second to fourth embodiments) and background type data coping (copying data from the distributed site 140 regardless of the presence or absence of a read request from the host 130 for analysis) as in the fifth embodiment or switches between them. That is, both the on-demand type data copying and the background type data copying may be performed in the same period or an adopting period of one copying may be different from an adopting period of the other copying.

The following is one specific example.

A reference volume 2821 is an example of a second volume and is assumed to be a virtual volume. The reference destination of a page of the reference volume 2821 may be a page in a copy volume 2822 or may be a page in D-vol described above.

Further, similar to the first embodiment, when an edge controller 290 receives a write request from a host 160, the edge controller 290 transmits an update notification including an ID of a write destination page to the core controller 240. As a result, updating of an update bitmap table 340 is reflected in a copy state management table 370. The edge controller 290 provides a volume 2891 (an example of a first volume).

The core controller 240 manages a new page access count for the reference volume 2821. A "new page" is a page that is the access destination (read source or write destination) for the first time after the reference volume 2821 is provided to the host 130 for analysis.

The core controller 240 updates (for example, increments) a new page access count each time a new page of the reference volume 2821 is accessed.

The core controller 240 regularly resets the new page access count to 0 (zero). For example, the resetting may be performed "before execution of analysis processing" in accordance with an execution schedule of the analysis processing, or may be performed at a predetermined cycle.

If the new page access count is 0, it means that all data necessary for the analysis processing has been acquired from an edge storage 150. This state is a state that meets a storage state condition to be a condition under which it is considered that data is sufficiently stored in the reference volume 2821. An example of the storage state condition is that the new page access count is a predetermined count or less (for example, 0). Another example of the storage state condition is that a utilization rate of the reference volume 2821 is a predetermined utilization rate or more. The utilization rate of the reference volume 2821 is a ratio of an amount of data (page in which the reference destination exists) stored in the reference volume 2821 to a capacity of the reference volume 2821.

The core controller 240 determines whether or not the storage state condition is satisfied regularly or irregularly (S31).

<Case Where Storage State Condition is not Satisfied (for Example, Case Where New Page Access Count is 1 or More)>

The core controller 240 does not start the background type data copying and maintains a state of adopting the on-demand type data copying (S32). That is, the core controller 240 receives a read request from the host 130 for analysis (S21) and performs core read processing.

That is, the core controller 240 refers to the copy state management table 370 corresponding to an LU designated by the read request (FIG. 31: step 2110), and specifies an entry corresponding to a read source page (page belonging to an address designated by the read request).

Figure 31:
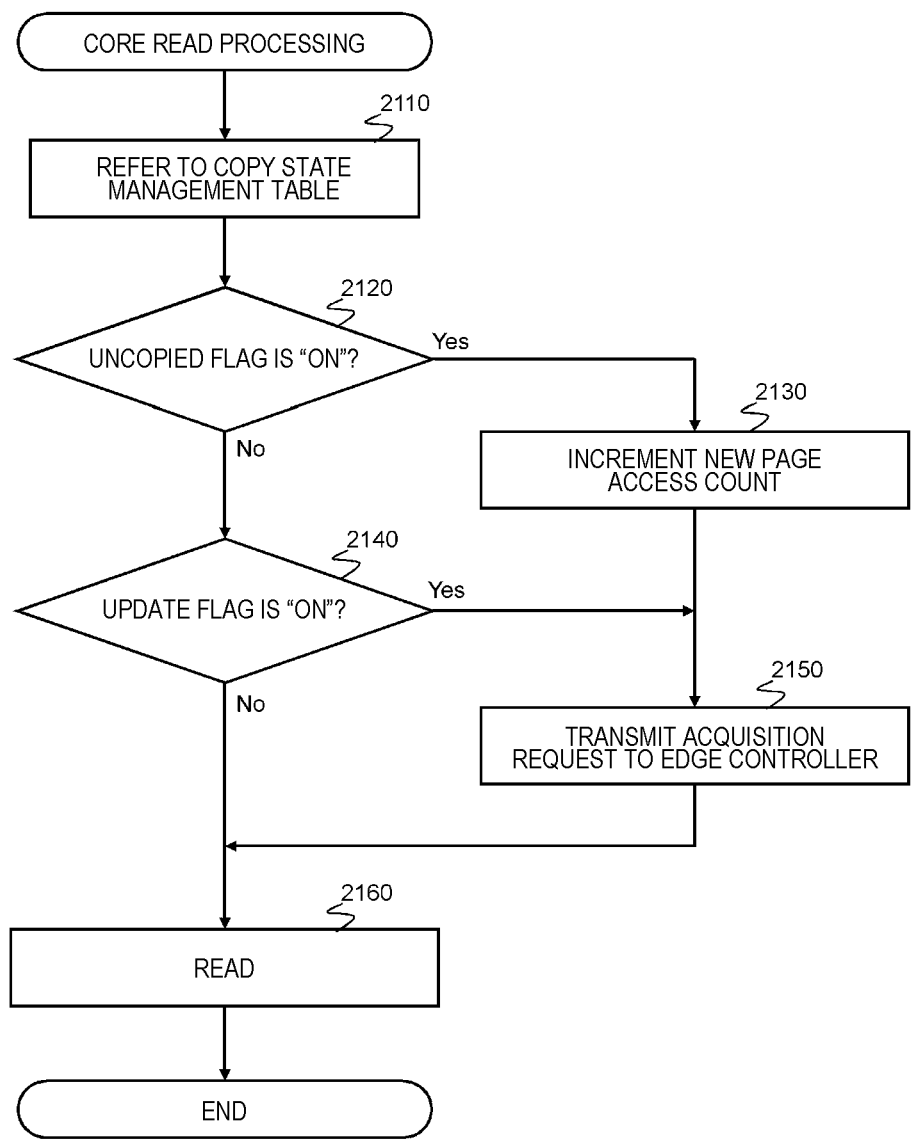
FIG. 31 is a flowchart of core read processing in the sixth embodiment.

When an uncopied flag 573 in the specified entry is "ON" (that is, when the read source page is a new page), the core controller 240 increments a new page access count (FIG. 30: S22 and FIG. 31: step 2130), and transmits an acquisition request of the read target data to the edge storage 150 (FIG. 31: step 2150). Thereby, the core controller 240 acquires the read target data from the edge storage 150 (FIG. 30: S23). The core controller 240 stores the acquired read target data in the read source page (for example, stores the read target data in a free D-vol page allocated to the read source page), reads the read target data from the page, and returns the read target data to the host 130 for analysis. Then, the core controller sets both an update flag 572 and an uncopied flag 573 of the page in the copy state management table 370 to "OFF".

When the update flag 572 in the specified entry is "ON" (that is, after copying due to the uncopied flag being ON is performed, when the page is updated in the edge storage, and the updating is notified from the edge controller to the core controller, but the latest data is not still acquired), the core controller 240 transmits the acquisition request of the read target data to the edge storage 150 (FIG. 31: step 2150). The core controller 240 stores the acquired read target data in the read source page (for example, stores the read target data in a free D-vol page newly allocated to the read source page or the allocated D-vol page), and reads the read target data from the page, and returns the read target data to the host 130 for analysis. Then, the core controller sets the update flag 572 of the page in the copy state management table 370 to "OFF".

<Case Where Storage State Condition is Satisfied (for Example, Case Where New Page Access Count is 0)>

The core controller 240 starts the background type data copying (FIG. 30: S33). That is, when the core controller 240 detects that there is updated data in the edge storage 150 (when there is a page corresponding to the update flag 572 "ON"), the core controller 240 copies the data from the edge storage 150 to the copy volume 2822 (an example of a third volume) (S34).

In the sixth embodiment, the on-demand type data copying and the background type data copying are automatically switched, but may be switched manually by an administrator or the like. For example, the core controller 240 may notify a management system (system that manages the storage system) of information (for example, a new page access count) regarding a storage state of the reference volume 2821, may receive, from the management system, an instruction of the administrator who has seen the information, and may determine whether or not to start the background type data copying. After the start of the background type data copying, the core controller 240 may not perform the on-demand type data copying regardless of whether or not the update flag 572 corresponding to the read source page is "ON". When the update flag 572 corresponding to the read source page is "ON", the core controller 240 may also perform the on-demand type data copying.

According to the sixth embodiment, it can be expected that both the effects of the first embodiment (and the second to fourth embodiments) and the effects of the fifth embodiment are achieved.

Although some embodiments of the present invention have been described above, it goes without saying that the present invention is not limited to these embodiments and various changes can be made without departing from the gist thereof.

For example, when the core controller 240 (or the object controller 840) receives a read request from the host for analysis, the core controller 240 may request the edge controller 290 (or the file controller 890) to transmit an update notification indicating a page (or a data set) updated after issuing the update notification last time, and may update the copy state management table 370 (or the object management table 1012), on the basis of the update notification (for example, the update bitmap table 340) received in response to the request.

REFERENCE SIGNS LIST 200 computer system

The invention claimed is:

1. A storage system comprising:
a first storage device which exists in a first site; and
a second storage device which is a storage device existing in a second site and is a storage device connected to the first storage device via a network,
wherein
the first storage device provides a first volume capable of including a plurality of first elements each of which is a volume area or a data set,
the second storage device provides a second volume capable of including a plurality of second elements each of which is a volume area or a data set and which correspond to the plurality of first elements,
the first storage device transmits an update notification regarding the first element updated according to a write request from a first host to the second storage device,
when the second storage device receives the update notification, the second storage device manages data of the first element corresponding to the second element as latest data, for the second element specified on the basis of the update notification, and
when the second storage device receives a read request from a second host,
(A) the second storage device determines whether or not data of the first element corresponding to a read source second element to be the second element specified from the read request is the latest data,
(B) the second storage device transmits an acquisition request of the latest data to the first storage device, when a determination result of (A) is that the data of the first element corresponding to the read source second element is not the latest data, and (C) the second storage device sets the latest data acquired from the first storage device in response to the acquisition request as data of the read source second element and returns the latest data to the second host, wherein both each first element and each second element are volume areas, the second storage device has copy management information, the copy management information includes, for each second element, a first information element indicating whether or not the update notification including an ID of the first element corresponding to the second element has been received after data copying last time from the first storage device to the second storage device and a second information element indicating whether or not data has never been copied from the first storage device to the second element since the second volume was created, and when at least one of the first and second information elements corresponding to the read source second element has a positive value, the determination result of (A) is that the data of the first element corresponding to the read source second element is not the latest data.

2. The storage system according to claim 1, wherein both each first element and each second element are volume areas, and the update notification includes an ID of the first element corresponding to a difference between the first volume of a latest generation and the first volume of a generation when the update notification is transmitted last time.

3. The storage system according to claim 1, wherein, when the second storage device receives the update notification, the second storage device updates a value of the first information element for the second element corresponding to the first element specified from the update notification to a positive value.

4. The storage system according to claim 1, wherein, when the first storage device receives the write request from the first host, the second storage device receives the update notification regarding the first element updated according to the write request.

5. A storage system comprising:

a first storage device which exists in a first site; and a second storage device which is a storage device existing in a second site and is a storage device connected to the first storage device via a network, wherein the first storage device provides a first volume capable of including a plurality of first elements each of which is a volume area or a data set, the second storage device provides a second volume capable of including a plurality of second elements each of which is a volume area or a data set and which correspond to the plurality of first elements, the first storage device transmits an update notification regarding the first element updated according to a write request from a first host to the second storage device, when the second storage device receives the update notification, the second storage device manages data of the first element corresponding to the second element as latest data, for the second element specified on the basis of the update notification, and when the second storage device receives a read request from a second host, (A) the second storage device determines whether or not data of the first element corresponding to a read source second element to be the second element specified from the read request is the latest data, (B) the second storage device transmits an acquisition request of the latest data to the first storage device, when a determination result of (A) is that the data of the first element corresponding to the read source second element is not the latest data, and (C) the second storage device sets the latest data acquired from the first storage device in response to the acquisition request as data of the read source second element and returns the latest data to the second host, wherein both each first element and each second element are data sets, the first storage device transmits a stub creation request to be a request to create a stub of the data set to the second storage device, the second storage device creates a stub recognized from the second host to be the stub of the data set designated by the stub creation request, in response to the stub creation request from the first storage device, the read request is a read request designating the created stub, and the acquisition request is an acquisition request of the data set corresponding to the stub.

6. The storage system according to claim 5, wherein the second storage device has copy management information, the copy management information includes, for each second element, a first information element indicating whether or not the update notification including an ID of the first element corresponding to the second element has been received after data copying last time from the first storage device to the second storage device and a second information element indicating whether or not there is the stub of the data set instead of the data set as the second element being copied from the first storage device, and when at least one of the first and second information elements corresponding to the read source second element has a positive value, the determination result of (A) is true.

7. The storage system according to claim 5, wherein a type of the data set to be the first element and a type of the data set to be the second element are different from each other, the first storage device has first search information indicating a correspondence relation between an ID of the first element and an ID of the second element and second search information indicating a correspondence relation between the ID of the second element and the ID of the first element, the first storage device specifies the ID of the second element corresponding to the ID of the updated first element from the first search information, the update notification is an update notification including the specified ID of the second element, the acquisition request includes a stub ID to be an ID of the stub as the ID of the second element, and (F) the first storage device specifies the ID of the first element corresponding to the stub ID in the acquisition request from the second search information and (G) the first storage device returns the data set as the first element corresponding to the ID specified by (F) to the second storage device.

8. The storage system according to claim 7, wherein each first element is a file or a directory, each second element is an object or a stub thereof, and when the data set as the first element corresponding to the ID specified by (F) is the directory, (H) the first storage device creates a stub of each of all data sets stored in the directory in the first volume.

9. A storage system comprising:

a first storage device which exists in a first site; and a second storage device which is a storage device existing in a second site and is a storage device connected to the first storage device via a network, wherein the first storage device provides a first volume capable of including a plurality of first elements each of which is a volume area or a data set, the second storage device provides a second volume capable of including a plurality of second elements each of which is a volume area or a data set and which correspond to the plurality of first elements, the first storage device transmits an update notification regarding the first element updated according to a write request from a first host to the second storage device, when the second storage device receives the update notification, the second storage device manages data of the first element corresponding to the second element as latest data, for the second element specified on the basis of the update notification, and when the second storage device receives a read request from a second host, (A) the second storage device determines whether or not data of the first element corresponding to a read source second element to be the second element specified from the read request is the latest data, (B) the second storage device transmits an acquisition request of the latest data to the first storage device, when a determination result of (A) is that the data of the first element corresponding to the read source second element is not the latest data, and (C) the second storage device sets the latest data acquired from the first storage device in response to the acquisition request as data of the read source second element and returns the latest data to the second host, wherein, when the first storage device receives the acquisition request from the second storage device in the middle of data migration from a third storage device to the first storage device, it is determined whether or not latest data of an acquisition target according to the acquisition request has migrated to the first storage device, when a determination result is true, the latest data is returned to the second storage device, and when the determination result is false, the latest data is acquired from the third storage device and is returned to the second storage device.

10. The storage system according to claim 9, wherein both each first element and each second element are data sets, and when a target existing in the first storage device as the acquisition target is a stub of the data set, the determination result is false.

11. The storage system according to claim 9, wherein it is determined whether a request source of a request received in the middle of data migration from the third storage device to the first storage device is the second storage device or the first host, when the request source is the second storage device, the received request is the acquisition request and the first storage device returns data acquired from the third storage device to the second storage device without storing the data in the first volume, and when the request source is the first host, the received request is a read request and the first storage device stores the data acquired from the third storage device to be data according to the read request in the first volume and returns the data to the first host.

12. A storage system comprising:

a first storage device which exists in a first site; and a second storage device which is a storage device existing in a second site and is a storage device connected to the first storage device via a network, wherein the first storage device provides a first volume capable of including a plurality of first elements each of which is a volume area or a data set, the second storage device provides a second volume capable of including a plurality of second elements each of which is a volume area or a data set and which correspond to the plurality of first elements, the first storage device transmits an update notification regarding the first element updated according to a write request from a first host to the second storage device, when the second storage device receives the update notification, the second storage device manages data of the first element corresponding to the second element as latest data, for the second element specified on the basis of the update notification, and when the second storage device receives a read request from a second host, (A) the second storage device determines whether or not data of the first element corresponding to a read source second element to be the second element specified from the read request is the latest data, (B) the second storage device transmits an acquisition request of the latest data to the first storage device, when a determination result of (A) is that the data of the first element corresponding to the read source second element is not the latest data, and (C) the second storage device sets the latest data acquired from the first storage device in response to the acquisition request as data of the read source second element and returns the latest data to the second host, wherein the second storage device further has a third volume, the second storage device determines whether or not a storage state condition to be a condition under which it is considered that data is sufficiently stored in the second volume is satisfied, when a determination result is false, the second storage device maintains a state of adopting on-demand type data copying which is to acquire latest data from the first storage device if data of the first element corresponding to the second element specified from a read request from the second host in response to the read request is the latest data, and when the determination result is true, the second storage device starts background type data copying which is to acquire data from the first storage device to the third volume regardless of the presence or absence of the read request from the second host.

13. The storage system according to claim 12, wherein, when the storage state condition is satisfied, the number of second elements newly accessed in the second storage device is less than a predetermined number.

* * * * *